(12) United States Patent
Ylitalo et al.

(10) Patent No.: US 11,682,185 B2
(45) Date of Patent: *Jun. 20, 2023

(54) PERSONAL PROTECTIVE EQUIPMENT MANAGEMENT SYSTEM USING OPTICAL PATTERNS FOR EQUIPMENT AND SAFETY MONITORING

(71) Applicant: 3M INNOVATIVE PROPERTIES COMPANY, St. Paul, MN (US)

(72) Inventors: Caroline M. Ylitalo, Stillwater, MN (US); Kui Chen-Ho, Woodbury, MN (US); Paul L. Acito, St. Paul, MN (US); Tien Yi T. H. Whiting, St. Paul, MN (US); James B. Snyder, Minneapolis, MN (US); Travis L. Potts, Woodbury, MN (US); James W. Howard, North Oaks, MN (US); James L. C. Werness, Jr., Edina, MN (US); Suman K. Patel, Woodbury, MN (US); Charles A. Shaklee, Somerset, WI (US); Katja Hansen, Düsseldorf (DE); Glenn E. Casner, Woodbury, MN (US); Kiran S. Kanukurthy, Cottage Grove, MN (US); Steven T. Awiszus, Woodbury, MN (US); Neeraj Sharma, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/655,178

(22) Filed: Mar. 17, 2022

(65) Prior Publication Data
US 2022/0215665 A1 Jul. 7, 2022

Related U.S. Application Data

(63) Continuation of application No. 16/649,292, filed as application No. PCT/IB2018/056981 on Sep. 12, 2018, now Pat. No. 11,314,971.

(Continued)

(51) Int. Cl.
*G06K 9/00* (2022.01)
*G06V 10/22* (2022.01)
(Continued)

(52) U.S. Cl.
CPC ....... *G06V 10/225* (2022.01); *G06K 7/10722* (2013.01); *G06K 7/12* (2013.01);
(Continued)

(58) Field of Classification Search
CPC .. G06K 9/00771; G06K 7/10722; G06K 7/12; G06K 9/2054; G06K 9/3208;
(Continued)

(56) References Cited

U.S. PATENT DOCUMENTS 3,709,580 A 1/1973 Fugitt
3,887,268 A 6/1975 Golden
(Continued)

FOREIGN PATENT DOCUMENTS

AU 80187-87 5/1988
CA 2000405 4/1990
(Continued)

OTHER PUBLICATIONS

"Decision Tree", Wikipedia, [retrieved from the internet on Sep. 27, 2019], URL <http://en.wikipedia.org/wiki/Decision_tree>, 5 pages.
(Continued)

*Primary Examiner* — Christopher M Brandt
(74) *Attorney, Agent, or Firm* — Steven A. Bern

(57) ABSTRACT

In general, techniques are described for a personal protective equipment (PPE) management system (PPEMS) that uses
(Continued)

images of optical patterns embodied on articles of personal protective equipment (PPEs) to identify safety conditions that correspond to usage of the PPEs. In one example, an article of personal protective equipment (PPE) includes a first optical pattern embodied on a surface of the article of PPE; a second optical pattern embodied on the surface of the article of PPE, wherein a spatial relation between the first optical pattern and the second optical pattern is indicative of an operational status of the article of PPE.

10 Claims, 16 Drawing Sheets

Related U.S. Application Data

(60) Provisional application No. 62/564,101, filed on Sep. 27, 2017.

(51) Int. Cl.
    *G06K 7/10*        (2006.01)
    *G06K 7/12*        (2006.01)
    *G06T 1/00*        (2006.01)
    *G06V 20/52*      (2022.01)
    *G06V 10/24*      (2022.01)

(52) U.S. Cl.
    CPC .......... *G06T 1/0014* (2013.01); *G06V 10/245* (2022.01); *G06V 20/52* (2022.01)

(58) Field of Classification Search
    CPC .. G06K 9/3216; G06K 9/2063; G06T 1/0014; G02B 27/32
    See application file for complete search history.

(56) References Cited

U.S. PATENT DOCUMENTS

| | | | |
|---|---|---|---|
| 3,894,790 A | 7/1975 | Golden | |
| 4,244,683 A | 1/1981 | Rowland | |
| 4,361,911 A | 11/1982 | Buser | |
| 4,618,518 A | 10/1986 | Pricone | |
| 4,672,089 A | 6/1987 | Pricone | |
| 4,835,720 A | 5/1989 | Ditto | |
| 5,023,597 A | 6/1991 | Salisbury | |
| 5,153,928 A | 10/1992 | Iizuka | |
| 5,164,707 A | 11/1992 | Rasmussen | |
| 5,495,097 A | 2/1996 | Katz | |
| 5,565,669 A | 10/1996 | Liu | |
| 5,656,360 A | 8/1997 | Faykish | |
| 5,889,615 A | 3/1999 | Dreyer | |
| 5,902,988 A | 5/1999 | Durbin | |
| D413,731 S | 9/1999 | Hannington | |
| 5,948,488 A | 9/1999 | Marecki | |
| 5,988,505 A | 11/1999 | Shellhammer | |
| 6,010,223 A | 1/2000 | Gubela, Sr. | |
| 6,097,839 A | 8/2000 | Liu | |
| 6,446,865 B1 * | 9/2002 | Holt ......................... | G06K 7/12 |
| | | | 235/382 |
| 6,595,420 B1 | 7/2003 | Wilz, Sr. | |
| D480,879 S | 10/2003 | Boehm | |
| 6,674,878 B2 | 1/2004 | Ratterath | |
| 6,677,030 B2 | 1/2004 | Thakkar | |
| 6,832,728 B2 | 12/2004 | Kennedy | |
| 7,045,766 B2 | 5/2006 | Majima | |
| 7,110,618 B2 | 9/2006 | Bobrov | |
| 7,140,741 B2 | 11/2006 | Fleming | |
| 7,263,217 B2 | 8/2007 | Kawaike | |
| 7,387,393 B2 | 6/2008 | Reich | |
| 7,505,620 B2 | 3/2009 | Braune | |
| 7,661,596 B1 | 2/2010 | Spitz | |
| 7,720,259 B2 | 5/2010 | Gordon | |
| 7,756,411 B2 | 7/2010 | Tanaka | |
| 7,783,443 B2 | 8/2010 | Aratani | |
| 7,874,490 B2 | 1/2011 | Thomas, III | |
| 8,113,434 B2 | 2/2012 | Thomas, III | |
| 8,126,640 B2 | 2/2012 | Winner | |
| 8,195,394 B1 | 6/2012 | Zhu | |
| 8,208,681 B2 | 6/2012 | Heller | |
| 8,279,277 B2 | 10/2012 | Nam | |
| 8,294,580 B2 | 10/2012 | Witwer | |
| 8,320,634 B2 | 11/2012 | Deutsch | |
| 8,330,823 B2 | 12/2012 | Gordon | |
| 8,456,308 B2 | 6/2013 | Nelson | |
| 8,470,394 B2 | 6/2013 | Koppes | |
| 8,493,502 B2 | 7/2013 | Manabe | |
| 8,584,950 B2 | 11/2013 | Endo | |
| 8,659,668 B2 | 2/2014 | Cotter | |
| 8,660,311 B2 | 2/2014 | Retterath | |
| 8,842,019 B2 | 9/2014 | Boccola | |
| 8,851,688 B2 | 10/2014 | Huang | |
| 8,988,638 B2 | 3/2015 | Jiang | |
| 9,070,057 B2 | 6/2015 | Hamilton | |
| 9,143,843 B2 | 9/2015 | De Luca | |
| 9,248,470 B2 | 2/2016 | Koppes | |
| 9,349,043 B2 | 5/2016 | Ryu | |
| 9,401,024 B2 | 7/2016 | Kwiatkowski | |
| 9,430,708 B2 | 8/2016 | Han | |
| 9,471,863 B2 | 10/2016 | Fleming | |
| 9,519,087 B2 | 12/2016 | Nakajima | |
| 2001/0012153 A1 | 8/2001 | Halter | |
| 2002/0134839 A1 | 9/2002 | Iwaki | |
| 2003/0001019 A1 | 1/2003 | Corby, Jr. | |
| 2003/0138133 A1 | 7/2003 | Nagaoka | |
| 2003/0193717 A1 | 10/2003 | Gubela, Sr. | |
| 2004/0257627 A1 | 12/2004 | McClurg | |
| 2005/0023352 A1 | 2/2005 | Patel | |
| 2005/0063565 A1 | 3/2005 | Nagaoka | |
| 2005/0111698 A1 | 5/2005 | Kawai | |
| 2005/0119779 A1 | 6/2005 | Amico | |
| 2006/0027661 A1 | 2/2006 | Hosoi | |
| 2006/0140485 A1 | 6/2006 | Hing | |
| 2006/0209013 A1 | 9/2006 | Fengels | |
| 2007/0023523 A1 | 2/2007 | Onishi | |
| 2007/0222565 A1 | 9/2007 | Kawamata | |
| 2008/0000976 A1 | 1/2008 | Thomas | |
| 2008/0017717 A1 | 1/2008 | Miyazaki | |
| 2008/0085033 A1 | 4/2008 | Haven | |
| 2009/0161918 A1 | 6/2009 | Heller | |
| 2009/0208065 A1 | 8/2009 | Miura | |
| 2009/0279738 A1 | 11/2009 | Sasaki | |
| 2010/0117989 A1 | 5/2010 | Chang | |
| 2010/0151213 A1 | 6/2010 | Smithson | |
| 2010/0245554 A1 | 9/2010 | Nam | |
| 2011/0007950 A1 | 1/2011 | Deutsch | |
| 2011/0228089 A1 | 9/2011 | Almeida | |
| 2011/0288659 A1 | 11/2011 | Nelson | |
| 2012/0061469 A1 | 3/2012 | Sonoda | |
| 2012/0081214 A1 | 4/2012 | Alan | |
| 2012/0146789 A1 | 6/2012 | De Luca | |
| 2012/0286949 A1 * | 11/2012 | Worthington ...... | G08B 21/0446 |
| | | | 340/669 |
| 2012/0314071 A1 | 12/2012 | Rosenbaum | |
| 2013/0075473 A1 | 3/2013 | Wang | |
| 2013/0147938 A1 | 6/2013 | McCloskey | |
| 2013/0257622 A1 | 10/2013 | Davalos | |
| 2013/0274587 A1 * | 10/2013 | Coza .................... | A61B 5/0002 |
| | | | 600/595 |
| 2013/0282609 A1 | 10/2013 | Au | |
| 2013/0329988 A1 | 12/2013 | Levi | |
| 2014/0307076 A1 * | 10/2014 | Deutsch .................. | F16P 3/147 |
| | | | 348/77 |
| 2015/0029012 A1 | 1/2015 | Mitani | |
| 2015/0131856 A1 | 5/2015 | Matsunaga | |
| 2015/0199018 A1 | 7/2015 | Kim | |
| 2015/0332463 A1 | 11/2015 | Galera | |
| 2016/0012301 A1 | 1/2016 | Arndt | |
| 2016/0054496 A1 | 2/2016 | Ichihashi | |
| 2016/0102432 A1 | 4/2016 | Chen | |
| 2016/0106174 A1 * | 4/2016 | Chung ................. | A42B 3/0433 |
| | | | 340/539.13 |
| 2016/0162747 A1 | 6/2016 | Singh | |

(56) References Cited

U.S. PATENT DOCUMENTS

| | | | |
|---|---|---|---|
| 2016/0252611 A1 | 9/2016 | Guecker | |
| 2016/0265762 A1* | 9/2016 | Yoshida | F21V 23/023 |
| 2016/0275326 A1 | 9/2016 | Falkenstern | |
| 2017/0083775 A1 | 3/2017 | Grauer | |
| 2017/0368381 A1 | 12/2017 | Awiszus | |
| 2017/0372216 A1 | 12/2017 | Awiszus | |
| 2017/0374436 A1* | 12/2017 | Awiszus | A62B 9/00 |
| 2018/0108236 A1* | 4/2018 | Kanukurthy | A62B 9/006 |
| 2019/0037934 A1* | 2/2019 | Swank | G08B 5/004 |
| 2020/0046040 A1* | 2/2020 | Kanukurthy | A62B 17/00 |
| 2020/0279116 A1* | 9/2020 | Ylitalo | G06T 1/0014 |

FOREIGN PATENT DOCUMENTS

| | | |
|---|---|---|
| CA | 2020748 | 2/1991 |
| CA | 2252433 | 3/2006 |
| CA | 2880914 | 2/2014 |
| CA | 2938784 | 1/2019 |
| CN | 101105817 | 1/2008 |
| CN | 102693427 | 9/2012 |
| CN | 104424201 | 3/2015 |
| CN | 104635286 | 5/2015 |
| CN | 204719258 | 10/2015 |
| CN | 106056120 | 10/2016 |
| CN | 106056132 | 10/2016 |
| CN | 106022375 | 7/2019 |
| DE | 102004012811 | 11/2004 |
| DE | 102012106673 | 5/2014 |
| DE | 102013206915 | 10/2014 |
| EP | 0498499 | 8/1992 |
| EP | 0789314 | 8/1997 |
| EP | 0944018 | 9/1999 |
| EP | 1246118 | 10/2002 |
| EP | 1417634 | 5/2004 |
| EP | 1860594 | 11/2007 |
| EP | 1897751 | 3/2008 |
| EP | 1975650 | 10/2008 |
| EP | 2081131 | 7/2009 |
| EP | 2110035 | 10/2009 |
| EP | 2233818 | 9/2010 |
| EP | 2602740 | 6/2013 |
| EP | 2653772 | 10/2013 |
| EP | 2916147 | 9/2015 |
| EP | 2919150 | 9/2015 |
| EP | 3089003 | 11/2016 |
| EP | 3229047 | 10/2017 |
| FR | 2848167 | 6/2004 |
| GB | 2127344 | 4/1984 |
| GB | 2286152 | 8/1995 |
| GB | 2383222 | 6/2003 |
| GB | 2443664 | 5/2008 |
| IL | 75659 | 5/1990 |
| JP | 07223487 | 8/1995 |
| JP | 07223488 | 8/1995 |
| JP | 08122062 | 5/1996 |
| JP | H09134498 | 5/1997 |
| JP | 2580396 | 9/1998 |
| JP | H11272849 | 10/1999 |
| JP | 11328364 | 11/1999 |
| JP | 2003288600 | 10/2003 |
| JP | 2003302470 | 10/2003 |
| JP | 2004145660 | 5/2004 |
| JP | 2005309797 | 11/2005 |
| JP | 2006134339 | 5/2006 |
| JP | 2007072665 | 3/2007 |
| JP | 2007093629 | 4/2007 |
| JP | 2007156832 | 6/2007 |
| JP | 2007308110 | 11/2007 |
| JP | 2008070898 | 3/2008 |
| JP | 2008238927 | 10/2008 |
| JP | 2009020813 | 1/2009 |
| JP | 2010015235 | 1/2010 |
| JP | 2012195018 | 10/2012 |
| JP | 2015111483 | 6/2015 |
| SE | 201400134 | 10/2015 |
| WO | WO 1993-00576 | 1/1993 |
| WO | WO 1995-34043 | 12/1995 |
| WO | WO 1997-41466 | 11/1997 |
| WO | WO 1998-44202 | 10/1998 |
| WO | WO 1999-32940 | 7/1999 |
| WO | WO 1999-59271 | 11/1999 |
| WO | WO 2000-72275 | 11/2000 |
| WO | WO 2001-77721 | 10/2001 |
| WO | WO 2003-017184 | 2/2003 |
| WO | WO 2004-081612 | 9/2004 |
| WO | WO 2006-014974 | 2/2006 |
| WO | WO 2006-098954 | 9/2006 |
| WO | WO 2006-125224 | 11/2006 |
| WO | WO 2006-129249 | 12/2006 |
| WO | WO 2007-020666 | 2/2007 |
| WO | WO 2007-030530 | 3/2007 |
| WO | WO 2008-014090 | 1/2008 |
| WO | WO 2008-014831 | 2/2008 |
| WO | WO 2008-107987 | 9/2008 |
| WO | WO 2008-149923 | 12/2008 |
| WO | WO 2009-055738 | 4/2009 |
| WO | WO 2009-075987 | 6/2009 |
| WO | WO 2009-091681 | 7/2009 |
| WO | WO 2009-118197 | 10/2009 |
| WO | WO 2010-037158 | 4/2010 |
| WO | WO 2011-005222 | 1/2011 |
| WO | WO 2011-036414 | 3/2011 |
| WO | WO 2011-076200 | 6/2011 |
| WO | WO 2011-079592 | 7/2011 |
| WO | WO 2011-118540 | 9/2011 |
| WO | WO 2011-123741 | 10/2011 |
| WO | WO 2011-124483 | 10/2011 |
| WO | WO 2011-129832 | 10/2011 |
| WO | WO 2011-152843 | 12/2011 |
| WO | WO 2011-152844 | 12/2011 |
| WO | WO 2012-100082 | 7/2012 |
| WO | WO 2013-129352 | 9/2013 |
| WO | WO 2013-135608 | 9/2013 |
| WO | WO 2013-149142 | 10/2013 |
| WO | WO 2013-179588 | 12/2013 |
| WO | WO 2014-061188 | 4/2014 |
| WO | WO 2014-196171 | 12/2014 |
| WO | WO 2015-100284 | 7/2015 |
| WO | WO 2015-146414 | 10/2015 |
| WO | WO 2015-148426 | 10/2015 |
| WO | WO 2015-149009 | 10/2015 |
| WO | WO 2015-171406 | 11/2015 |
| WO | WO 2015-175024 | 11/2015 |
| WO | WO 2015-191132 | 12/2015 |
| WO | WO 2016-025207 | 2/2016 |
| WO | WO 2016-053734 | 4/2016 |
| WO | WO 2016-109620 | 7/2016 |
| WO | WO 2017-034968 | 3/2017 |
| WO | WO 2017-223367 | 12/2017 |
| WO | WO 2017-223438 | 12/2017 |
| WO | WO 2017-223451 | 12/2017 |
| WO | WO 2017-223459 | 12/2017 |
| WO | WO 2017-223469 | 12/2017 |
| WO | WO 2018-064089 | 4/2018 |
| WO | WO 2018-064198 | 4/2018 |
| WO | WO 2018-064203 | 4/2018 |
| WO | WO 2018-064212 | 4/2018 |
| WO | WO 2018-151759 | 8/2018 |
| WO | WO 2018-151761 | 8/2018 |
| WO | WO 2019-064108 | 4/2019 |
| WO | WO 2019-084302 | 5/2019 |

OTHER PUBLICATIONS

"K-Nearest Neighbors Algorithm", Wikipedia, [retrieved from the internet on Sep. 27, 2019], URL <http://en.wikipedia.org/wiki/K-nearest_neighbors_algorithm>, 11 pages.

"Linear Discriminant Analysis", Wikipedia, [retrieved from the internet on Sep. 27, 2019], URL <http://en.wikipedia.org/wiki/Linear_discriminant_analysis>, 12 pages.

"Quadratic Classifier", Wikipedia, [retrieved from the internet on Sep. 27, 2019], URL <http://en.wikipedia.org/wiki/Quadratic_classifier>, 3 pages.

(56) References Cited

OTHER PUBLICATIONS

"Random Forest", Wikipedia, [retrieved from the internet on Sep. 27, 2019], URL <http://en.wikipedia.org/wiki/Random_forest>, 6 pages.
"Support-Vector Machine", Wikipedia, [retrieved from the internet on Sep. 27, 2019], URL <http://en.wikipedia.org/wiki/Support_vector_machine>, 15 pages.
Barbarosoglu, "A Two-Stage Stochastic Programming Framework for Transportation Planning in Disaster Response", The Journal of the Operational Research Society, Jan. 2004, vol. 55, No. 1, pp. 43-53.
Dalal, "Histograms of Oriented Gradients for Human Detection", 2005 IEEE Computer Society Conference on Computer Vision and Pattern Recognition (CVPR'05)—San Diego, Jun. 2005, 8 pages.
Felzenszwalb, "Object Detection with Discriminatively Trained Part Based Models", IEEE Transactions on Pattern Analysis and Machine Intelligence, Sep. 2010, vol. 32, No. 9, pp. 1627-1645.
Icam, Inventory, Asset and Resource Management, Sydion, 3 pages.
Mete, "Stochastic optimization of medical supply location and distribution in disaster management", International Journal of Production Economics, Jul. 2010, vol. 126, No. 1, pp. 76-84.
Mori, "Efficient Shape Matching Using Shape Contexts", IEEE Transactions on Pattern Analysis and Machine Intelligence, Nov. 2005, vol. 27, No. 11, pp. 1832-1837.
Mosberger, "A Customized Vision System for Tracking Humans Wearing Reflective Safety Clothing from Industrial Vehicles and Machinery", Sensors, Sep. 2014, vol. 14, No. 10, pp. 17952-17980.
Mosberger, "Multi-band Hough Forest for Detecting Humans with Reflective Safety Clothing from Mobile Machinery", 2015 IEEE International Conference on Robotics and Automation (ICRA)—Seattle, May 2015, pp. 697-703.
Nakazato, "Localization of Wearable Users Using Visible Retro-reflective Markers and an IR Camera", Electronic Imaging 2005—San Jose California, Mar. 2015, Proceedings vol. 5664—Stereoscopic Displays and Virtual Reality Systems XII, 8 pages.
Nota, "Augmenting Real-world Objects by Detecting "Invisible" Visual Markers", UIST '08—Adjunct Proceedings of the 21th annual ACM Symposium on User Interface Software and Technology—Monterey California, Oct. 2008, 2 pages.
Rozantsev, "On Rendering Synthetic Images for Training an Object Detector", Computer Vision and Image Understanding, Aug. 2015, vol. 137, pp. 24-37.
Toshev, "Shape-Based Object Detection via Boundary Structure Segmentation", International Journal of Computer Vision, Sep. 2012, vol. 99, No. 2, pp. 123-146.
International Search Report for PCT International Application No. PCT/IB2018/056981, dated Dec. 14, 2018, 4 pages.

* cited by examiner

900

| Optical Pattern Code Pair | Equipment Pair |
|---|---|
| 00001, 00002 | Helmet with Visor |
| 00042, 00012 | Helmet with Safety Goggles |
| 08324, 85201 | Helmet with Ear Muffs |
| 38402, 38753 | Coveralls with Helmet |
| 23490, 50812 | Visor with Machine |
| 23450, 09234 | Helmet with Visor |
| 90534, 30592 | Coveralls with Workplace |

| Equipment Pair | Safety Condition | Operation |
|---|---|---|
| Helmet with Visor | Orientation Difference > 5 Degrees | Worker Notification |
| Helmet with Safety Goggles | Distance > 0.05 Meters or Orientation Difference > 5 Degrees | Worker Notification |
| Helmet with Ear Muffs | Distance > 0.08 Meters or Orientation Difference > 20 Degrees | Worker Notification |
| Coveralls with Helmet | Distance > 0.14 Meters or Distance < 0.03 Meters | Worker Notification |
| Visor with Machine | Distance < 2.5 Meters | Lock Machine |
| Coveralls with Workplace | Orientation Difference > 60 Degrees and Time > 30 Seconds | Supervisor Notification |

FIG. 10

Obscura 7x9 Code
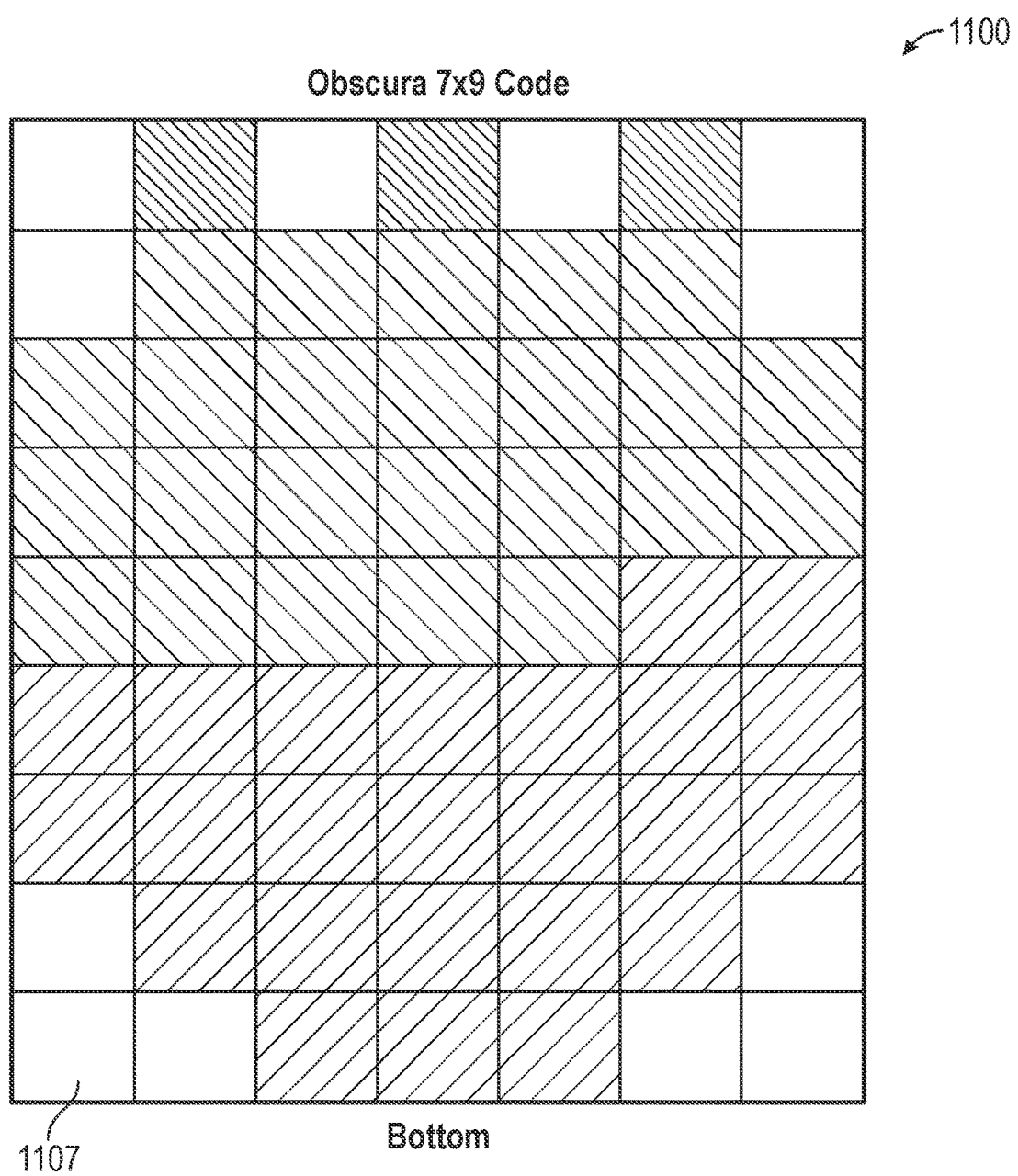
Bottom
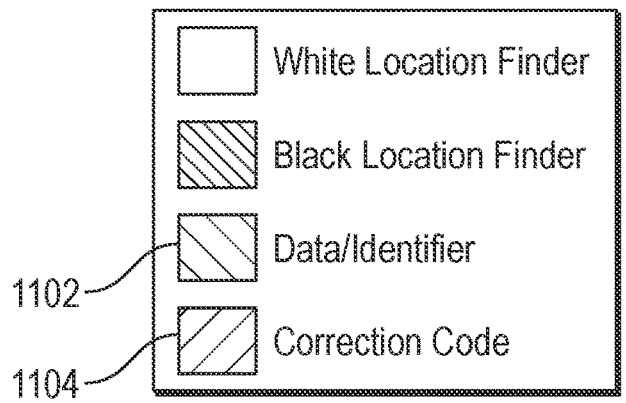
FIG. 11

| Printed square | without white mirror film | | with white mirror film | |
|---|---|---|---|---|
| | R% | Contrast ratio | R% | Contrast ratio |
| non-printed | 95.4 | 0 | 36.1 | 0 |
| process black | 91.1 | 0.04 | 35.3 | 0.02 |
| true black | 13.2 | 0.86 | 7.6 | 0.79 |

FIG. 14

PERSONAL PROTECTIVE EQUIPMENT MANAGEMENT SYSTEM USING OPTICAL PATTERNS FOR EQUIPMENT AND SAFETY MONITORING

CROSS REFERENCE TO RELATED APPLICATIONS

This application is a continuation of U.S. application Ser. No. 16/649,292, filed Mar. 20, 2020, which is a national stage filing under 35 U.S.C. 371 of PCT/IB2018/056981, filed Sep. 12, 2018, which claims the benefit of U.S. Provisional Application No. 62/564,101, filed Sep. 27, 2017, the disclosure of which is incorporated by reference in its/their entirety herein.

TECHNICAL FIELD

The present disclosure relates to the field of personal protective equipment. More specifically, the present disclosure relates to air respiratory systems such as filtered air systems.

BACKGROUND

Personal protective equipment (PPE) may be used to protect a user (e.g., a worker) from harm or injury from a variety of causes in a work environment. For example, fall protection equipment is important safety equipment for workers operating at potentially harmful or even deadly heights. To help ensure safety in the event of a fall, workers often wear safety harnesses connected to support structures with fall protection equipment such as lanyards, energy absorbers, self-retracting lifelines (SRLs), descenders, and the like. As another example, when working in areas where there is known to be, or there is a potential of there being, dusts, fumes, gases or other contaminants that are potentially hazardous or harmful to health, it is usual for a worker to use a respirator or a clean air supply source. While a large variety of respiratory devices are available, some commonly used devices include powered air purifying respirators (PAPR) and a self-contained breathing apparatus (SCBA). Other PPE include those for hearing protection (ear plugs, earmuffs), vision protection (safety spectacles, goggles, welding mask or other face shields), head protection (e.g., visors, hard hats, or the like), and protective clothing.

SUMMARY

In general, techniques are described for a personal protective equipment (PPE) management system (PPEMS) that uses images of optical patterns embodied on articles of personal protective equipment (PPEs) to identify safety conditions that correspond to usage of the PPEs. Personal protective equipment may be used in a variety of workplace environments and different types of PPE may have corresponding positional requirements for active operation in such environments.

According to aspects of this disclosure, an article of personal protective equipment (PPE) may have embodied thereon an optical pattern in an orientation. The PPE may in some examples have a plurality of optical patterns embodied thereon, each of the optical patterns in a corresponding orientation. A spatial relation between the optical patterns embodied on a PPE indicates an operational status of the PPE. For instance, for some types of a PPE, a distance between the optical patterns indicates the operational status of the PPE. For some types of PPE, a relative orientation between the respective orientations of the optical patterns indicates the operational status of the PPE.

According to aspects of this disclosure, a PPE management system (PPEMS) obtains images that include images of PPEs, such PPEs as described above and located within a work environment. The PPEMS processes one or more of the images to determine a spatial relation between the optical pattern embodied on the PPE and another optical pattern shown in the images. The other optical pattern may also be embodied on the PPE, another PPE or device, or elsewhere in the work environment. Based on the spatial relation, the PPEMS determines whether a safety condition corresponding to the PPE is present and performs an operation based on the presence or absence of the safety condition.

The techniques may provide one or more advantages. For example, identifying safety conditions using optical patterns in captured images of PPEs may be more versatile and widely applicable than using devices tied to the PPEs, such as sensors, locks, barriers, or other devices for indicating or ensuring an operational status of the PPE (e.g., open vs. closed) or for indicating an unsafe spatial relationship between a PPE and another apparatus. As another example, workers may be less able to defeat the safety techniques described herein. As a still further example, the PPEMS applying techniques described herein may be able to determine a safety condition for a PPE without requiring a communication session or channel with the PPE, unlike other systems that may rely on receiving a communication signal from a PPE indicating an operational status of the PPE. Furthermore, in some instances, the PPEMS may be able to process a captured image that includes images of multiple PPEs and respective optical patterns, which allows the PPEMS to concurrently process and identify potential safety for the multiple PPEs without having to process communication signals from each of the PPEs.

In one aspect, the present disclosure includes a system comprising at least one image capture device; an article of personal protective equipment (PPE) that includes a first optical pattern embodied on a surface of the article of PPE; a computing device communicatively coupled to the at least one image capture device, wherein the computing device is configured to: receive, from the at least one image capture device, one or more images that includes the first optical pattern and a second optical pattern; determine, based at least in part on the first optical pattern and the second optical pattern, a spatial relation between the first optical pattern and the second optical pattern; identify, based at least in part on the spatial relation between the first optical pattern and the second optical pattern, a safety condition that corresponds at least in part to the article of PPE; and perform at least one operation based at least in part on the safety condition.

In one aspect, the present disclosure includes an article of personal protective equipment (PPE) that includes a first optical pattern embodied on a surface of the article of PPE; a second optical pattern embodied on the surface of the article of PPE, wherein a spatial relation between the first optical pattern and the second optical pattern is indicative of an operational status of the article of PPE.

In one aspect, the present disclosure includes a pair of optical tags comprising a first optical tag and a second optical tag, the first optical tag having a first optical pattern encoding a first identifier and the second optical tag having a second optical pattern encoding a second identifier, wherein the first identifier and the second identifier indicate, to a personal protective equipment (PPE) management system, that the first optical tag and the second optical tag are usable as a pair of optical tags for indicating an operational status of an article of PPE when at least the first optical tag is attached to the article of PPE.

In one aspect, the present disclosure includes a method comprising receiving, by a computing device from at least one image capture device, an image that includes a first optical pattern embodied on a surface of an article of personal protective equipment (PPE) and also includes a second optical pattern; determining, by the computing device based at least in part on the first optical pattern and the second optical pattern, a spatial relation between the first optical pattern and the second optical pattern; identifying, by the computing device based at least in part on the spatial relation between the first optical pattern and the second optical pattern, a safety condition that corresponds at least in part to the article of PPE; and performing, by the computing device, at least one operation based at least in part on the safety condition.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 9 is a data structure, usable by a PPEMS, for identifying a safety condition in accordance with techniques described herein.

FIG. 10 is a data structure, usable by a PPEMS, for identifying a safety condition in accordance with techniques described herein.

FIG. 11 is an example of an encoding usable for an optical pattern for embodiment on an PPE, according to techniques of this disclosure.

FIG. 14 is a table of properties of example optical tags, according to techniques of this disclosure.

It is to be understood that the embodiments may be utilized and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
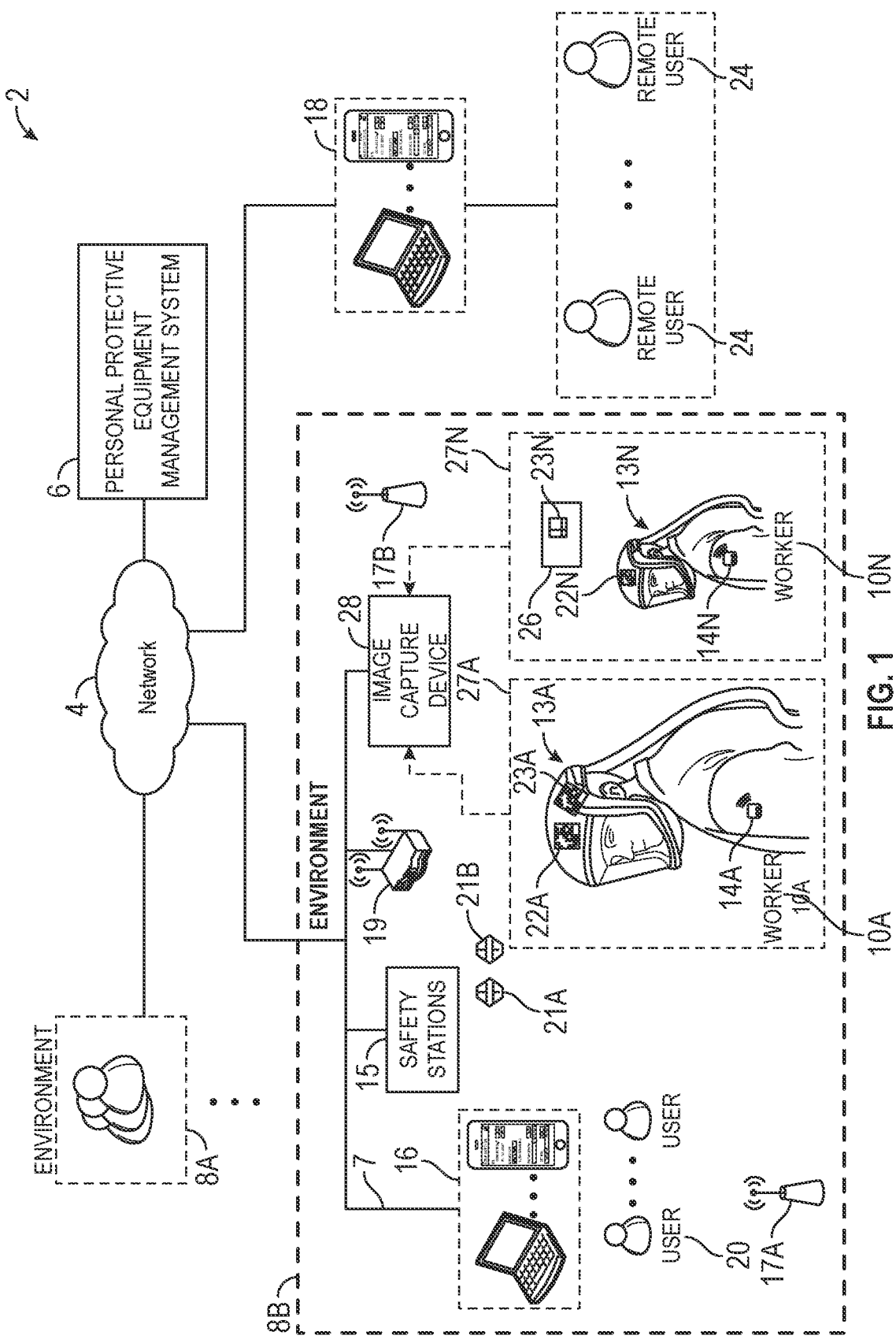
FIG. 1 is a block diagram illustrating an example system in which articles of personal protective equipment (PPEs) are monitored by a personal protective equipment management system (PPEMS) in accordance with various techniques of this disclosure.

FIG. 1 is a block diagram illustrating an example computing system 2 that includes a personal protective equipment management system (PPEMS) 6 for managing personal protective equipment, according to techniques described in this disclosure. In general, PPEMS 6 may provide data acquisition, monitoring, activity logging, reporting, predictive analytics, safety condition identification, and alert generation. For example, PPEMS 6 includes an underlying analytics and safety condition identification engine and alerting system in accordance with various examples described herein. In general, a safety event may refer to activities of a user of personal protective equipment (PPE), a safety condition of the PPE, or a hazardous environmental condition. For example, in the context of hearing, vision, or head protection equipment, a safety condition may be such protection equipment being in a standby configuration. In the context of hazardous equipment, a safety condition may be proximity of a worker to the hazardous equipment.

As further described below, PPEMS 6 may provide an integrated suite of personal safety protective equipment management tools and implements various techniques of this disclosure. That is, PPEMS 6 may provide an integrated, end-to-end system for managing personal protective equipment, e.g., safety equipment, used by workers 10 within one or more physical environments 8, which may be construction sites, mining or manufacturing sites or any physical environment. The techniques of this disclosure may be realized within various parts of computing environment 2.

As shown in the example of FIG. 1, system 2 represents a computing environment in which computing device(s) within a plurality of physical environments 8A, 8B (collectively, environments 8) electronically communicate with PPEMS 6 via one or more computer networks 4. Each of physical environment 8 represents a physical environment, such as a work environment, in which one or more individuals, such as workers 10, utilize personal protective equipment 13 while engaging in tasks or activities within the respective environment.

In this example, environment 8A is shown as generally as having workers 10, while environment 8B is shown in expanded form to provide a more detailed example. In the example of FIG. 1, a plurality of workers 10A-10N are shown as utilizing PPE 13A-13N. Although PPE 13 in the example of FIG. 1 are illustrated as respirators, the techniques described herein apply to other types of PPE, such as those for hearing protection, vision protection, and head protection, as well as protective clothing, trauma protection, other PPE for assisted/protective respiration, and so forth.

PPE 13 may include a number of components for which the physical spatial relationship between the components determines or otherwise indicates the operational status of the PPE for some types of PPE. For example, a face shield attached to a helmet or hardhat may be in an up or open (i.e., standby) position that provides no protection to the worker 10 or in a down or closed (i.e., active) position that provides protection to the worker 10. As another example, earmuffs attached to a helmet or hardhat may be positioned in an up (i.e., standby) position such that the earmuffs are not positioned over the worker 10 ears and provide no hearing protection to the worker 10, or the earmuffs may be positioned in a down position (i.e., active) such that the earmuffs are positioned over the worker 10 ears and provide hearing protection to the worker 10. A pair of components of PPE, such as those described above, may be referred to herein as an equipment pair, even if such components are typically used together as a single article of PPE. The operational status of a pair of PPE may be indicative of a safety condition.

A spatial relation between two or more PPE 13, for some types of PPE, may indicate the operational status of one or more of the PPE. For instance, a hardhat may be positioned on a worker's head in an active position according to a first orientation. Earmuffs may be positioned to enclose the worker's ears in an active position or positioned to not enclose the worker's ears in a standby position, according to a second orientation (typically vertical for over-the-head earmuffs). The difference between the first orientation of the helmet in the active position and the second orientation of the earmuffs may indicate whether the earmuffs are in an active position. The operational status of a pair of PPE may be indicative of a safety condition.

A spatial relation between an article, machine, signage or other items of a work environment 8 and a PPE for a worker 10 may indicate the operational status of the PPE. For example, a machine of environment 8A, when activated, may create various proximity hazards. The distance between a PPE positioned on the worker 10 and the machine indicates whether the worker is within a threshold distance for the proximity hazard, and the distance is thus indicative of a safety condition.

Each of PPE 13 may in some examples include embedded sensors or monitoring devices and processing electronics configured to capture data in real-time as a user (e.g., worker) engages in activities while wearing the respirators. PPE 13 may include a number of sensors for sensing or controlling the operation of such components. A head top may include, as examples, a head top visor position sensor, a head top temperature sensor, a head top motion sensor, a head top impact detection sensor, a head top position sensor, a head top battery level sensor, a head-top head detection sensor, an ambient noise sensor, or the like. A blower may include, as examples, a blower state sensor, a blower pressure sensor, a blower run time sensor, a blower temperature sensor, a blower battery sensor, a blower motion sensor, a blower impact detection sensor, a blower position sensor, or the like. A filter may include, as examples, a filter presence sensor, a filter type sensor, or the like. Each of the above-noted sensors may generate usage data, as described herein.

In addition, each of PPE 13 may include one or more output devices for outputting data that is indicative of operation of PPE 13 and/or generating and outputting communications to the respective worker 10. For example, PPE 13 may include one or more devices to generate audible feedback (e.g., one or more speakers), visual feedback (e.g., one or more displays, light emitting diodes (LEDs) or the like), or tactile feedback (e.g., a device that vibrates or provides other haptic feedback).

In general, each of environments 8 include computing facilities (e.g., a local area network) by which PPE 13 are able to communicate with PPEMS 6. For examples, environments 8 may be configured with wireless technology, such as 802.11 wireless networks, 802.15 ZigBee networks, and the like. In the example of FIG. 1, environment 8B includes a local network 7 that provides a packet-based transport medium for communicating with PPEMS 6 via network 4. Environment 8B may include wireless access point 19 to provide support for wireless communications. In some examples, environment 8B may include a plurality of wireless access points 19 that may be geographically distributed throughout the environment to provide support for wireless communications throughout the work environment.

Each of PPE 13 may be configured to communicate data, such as sensed motions, events and conditions, via wireless communications, such as via 802.11 WiFi protocols, Bluetooth protocol or the like. PPE 13 may, for example, communicate directly with a wireless access point 19. As another example, each worker 10 may be equipped with a respective one of wearable communication hubs 14A-14N that enable and facilitate communication between PPE 13 and PPEMS 6. For example, PPE 13 for the respective workers 10 may communicate with a respective communication hub 14 via Bluetooth or other short-range protocol, and the communication hubs may communicate with PPEMS 6 via wireless communications processed by wireless access point 19. Although shown as wearable devices, hubs 14 may be implemented as stand-alone devices deployed within environment 8B.

In general, each of hubs 14 operates as a wireless device for PPE 13 relaying communications to and from PPE 13, and may be capable of buffering usage data in case communication is lost with PPEMS 6. Moreover, each of hubs 14 is programmable via PPEMS 6 so that local alert rules may be installed and executed without requiring a connection to the cloud. As such, each of hubs 14 provides a relay of streams of usage data from PPE 13 and/or other PPEs within the respective environment, and provides a local computing environment for localized alerting based on streams of events in the event communication with PPEMS 6 is lost.

As shown in the example of FIG. 1, an environment, such as environment 8B, may also contain one or more wireless-enabled beacons, such as beacons 17A-17B, that provide accurate location information within the work environment. For example, beacons 17A-17B may be GPS-enabled such that a controller within the respective beacon may be able to precisely determine the position of the respective beacon. Based on wireless communications with one or more of beacons 17, a given PPE 13 or communication hub 14 worn by a worker 10 is configured to determine the location of the worker within work environment 8B. In this way, event data reported to PPEMS 6 may be stamped with positional information to aid analysis, reporting and analytics performed by the PPEMS.

In addition, an environment, such as environment 8B, may also include one or more wireless-enabled sensing stations, such as sensing stations 21A, 21B. Each sensing station 21 includes one or more sensors and a controller configured to output data indicative of sensed environmental conditions. Moreover, sensing stations 21 may be positioned within respective geographic regions of environment 8B or otherwise interact with beacons 17 to determine respective positions and include such positional information when reporting environmental data to PPEMS 6. As such, PPEMS 6 may be configured to correlate the sensed environmental conditions with the particular regions and, therefore, may utilize the captured environmental data when processing event data received from PPE 13. For example, PPEMS 6 may utilize the environmental data to aid generating alerts or other instructions for PPE 13 and for performing predictive analytics, such as determining any correlations between certain environmental conditions (e.g., heat, humidity, visibility) with abnormal worker behavior or increased safety events. As such, PPEMS 6 may utilize current environmental conditions to aid prediction and avoidance of imminent safety events. Example environmental conditions that may be sensed by sensing stations 21 include but are not limited to temperature, humidity, presence of gas, pressure, visibility, wind and the like.

In example implementations, an environment, such as environment 8B, may also include one or more safety stations 15 distributed throughout the environment to provide viewing stations for accessing PPE 13. Safety stations 15 may allow one of workers 10 to check out PPE 13 and/or other safety equipment, verify that safety equipment is appropriate for a particular one of environments 8, and/or exchange data. For example, safety stations 15 may transmit alert rules, software updates, or firmware updates to PPE 13 or other equipment. Safety stations 15 may also receive data cached on PPE 13, hubs 14, and/or other safety equipment. That is, while PPE 13 (and/or data hubs 14) may typically transmit usage data from sensors of PPE 13 via network 4 in real time or near real time, PPE 13 (and/or data hubs 14) may not have connectivity to network 4 in some instances, situations, or conditions. In such cases, PPE 13 (and/or data hubs 14) may store usage data locally and transmit the usage data to safety stations 15 upon being in proximity with safety stations 15. Safety stations 15 may then obtain the data from sensors of PPE 13 and connect to network 4 to transmit the usage data.

In addition, each of environments 8 may include computing facilities that provide an operating environment for end-user computing devices 16 for interacting with PPEMS 6 via network 4. For example, each of environments 8 typically includes one or more safety managers responsible for overseeing safety compliance within the environment. In general, each user 20 interacts with computing devices 16 to access PPEMS 6. Each of environments 8 may include systems. Similarly, remote users may use computing devices 18 to interact with PPEMS via network 4. For purposes of example, the end-user computing devices 16 may be laptops, desktop computers, mobile devices such as tablets or so-called smart phones and the like.

Users 20, 24 interact with PPEMS 6 to control and actively manage many aspects of safety equipment utilized by workers 10, such as accessing and viewing usage records, analytics and reporting. For example, users 20, 24 may review usage information acquired and stored by PPEMS 6, where the usage information may include data specifying starting and ending times over a time duration (e.g., a day, a week, etc.), data collected during particular events, such as lifts of a PPE 13 visor, removal of PPE 13 from a worker 10, changes to operating parameters of PPE 13, status changes to components of PPE 13 (e.g., a low battery event), motion of workers 10, detected impacts to PPE 13 or hubs 14, sensed data acquired from the user, environment data, and the like. In addition, users 20, 24 may interact with PPEMS 6 to perform asset tracking and to schedule maintenance events for individual pieces of safety equipment, e.g., PPE 13, to ensure compliance with any procedures or regulations. PPEMS 6 may allow users 20, 24 to create and complete digital checklists with respect to the maintenance procedures and to synchronize any results of the procedures from computing devices 16, 18 to PPEMS 6.

Further, PPEMS 6 may integrate an event processing platform configured to process thousand or even millions of concurrent streams of events from digitally enabled PPEs, such as PPE 13. An underlying analytics engine of PPEMS 6 may apply historical data and models to the inbound streams to compute assertions, such as identified anomalies or predicted occurrences of safety events based on conditions or behavior patterns of workers 10. Further, PPEMS 6 may provide real-time alerting and reporting to notify workers 10 and/or users 20, 24 of any predicted events, anomalies, trends, and the like.

The analytics engine of PPEMS 6 may, in some examples, apply analytics to identify relationships or correlations between sensed worker data, environmental conditions, geographic regions and other factors and analyze the impact on safety events. PPEMS 6 may determine, based on the data acquired across populations of workers 10, which particular activities, possibly within certain geographic region, lead to, or are predicted to lead to, unusually high occurrences of safety events.

In this way, PPEMS 6 tightly integrates comprehensive tools for managing personal protective equipment with an underlying analytics engine and communication system to provide data acquisition, monitoring, activity logging, reporting, behavior analytics and alert generation. Moreover, PPEMS 6 provides a communication system for operation and utilization by and between the various elements of system 2. Users 20, 24 may access PPEMS to view results on any analytics performed by PPEMS 6 on data acquired from workers 10. In some examples, PPEMS 6 may present a web-based interface via a web server (e.g., an HTTP server) or client-side applications may be deployed for devices of computing devices 16, 18 used by users 20, 24, such as desktop computers, laptop computers, mobile devices such as smartphones and tablets, or the like.

In some examples, PPEMS 6 may provide a database query engine for directly querying PPEMS 6 to view acquired safety information, compliance information and any results of the analytic engine, e.g., by the way of dashboards, alert notifications, reports and the like. That is, users 20, 24 or software executing on computing devices 16, 18, may submit queries to PPEMS 6 and receive data corresponding to the queries for presentation in the form of one or more reports or dashboards. Such dashboards may provide various insights regarding system 2, such as baseline ("normal") operation across worker populations, identifications of any anomalous workers engaging in abnormal activities that may potentially expose the worker to risks, identifications of any geographic regions within environments 8 for which unusually anomalous (e.g., high) safety events have been or are predicted to occur, identifications of any of environments 8 exhibiting anomalous occurrences of safety events relative to other environments, and the like.

As illustrated in detail below, PPEMS 6 may simplify workflows for individuals charged with monitoring and ensure safety compliance for an entity or environment. That is, PPEMS 6 may enable active safety management and allow an organization to take preventative or correction actions with respect to certain regions within environments 8, particular pieces of safety equipment or individual workers 10, define and may further allow the entity to implement workflow procedures that are data-driven by an underlying analytical engine.

As one example, the underlying analytical engine of PPEMS 6 may be configured to compute and present customer-defined metrics for worker populations within a given environment 8 or across multiple environments for an organization as a whole. For example, PPEMS 6 may be configured to acquire data and provide aggregated performance metrics and predicted behavior analytics across a worker population (e.g., across workers 10 of either or both of environments 8A, 8B). Furthermore, users 20, 24 may set benchmarks for occurrence of any safety incidences, and PPEMS 6 may track actual performance metrics relative to the benchmarks for individuals or defined worker populations.

As another example, PPEMS 6 may further trigger an alert if certain combinations of conditions are present, e.g., to accelerate examination or service of a safety equipment, such as one of PPE 13. In this manner, PPEMS 6 may identify individual PPE 13 or workers 10 for which the metrics do not meet the benchmarks and prompt the users to intervene and/or perform procedures to improve the metrics relative to the benchmarks, thereby ensuring compliance and actively managing safety for workers 10.

Item 26 located in environment 8B may be a machine, wall, signage, safety device, station, or other item. Item 26 may be stationary, at least during worker operation within the environment 8B.

In accordance with techniques described herein, PPE 13 are embodied with at least one optical pattern visible on a surface of the PPE 13. In the example of FIG. 1, PPE 13A worn by worker 10A has embodied therein an optical pattern 22A and an optical pattern 23A. Optical pattern 22A and the optical pattern 23A are associated with one another ("paired") in PPEMS 6. PPE 13N worn by worker 10N has embodied thereon an optical pattern 22N. An item 26 located in environment 8B has embodied therein an optical pattern 23N. Optical pattern 22N and the optical pattern 23N are associated with one another in PPEMS 6.

Each of optical patterns 22, 23 may be a machine-readable code. The machine-readable code may be printed with infrared absorbing ink to enable an infrared camera to obtain images that can be readily processed to identify the machine-readable code. The machine-readable code may be a unique identifier within the scope of PPE managed by PPEMS 6. In some cases, pairs of optical patterns 22, 23 may have the same optical pattern and the machine-readable code to indicate that optical patterns should be paired by PPEMS 6. PPEMS 6 may use the machine-readable code to uniquely identify the corresponding PPE 13, component thereof, or item 26 on which the optical pattern is embodied. An optical pattern can be embodied on different types of PPE 13, such as protective eyewear, helmets, face shields, ear muffs, fall protection harness, coveralls, or respirators.

Optical patterns 22, 23 are embodied on a surface of a PPE 13 to be visible such that image capture device 28 may obtain images of the optical patterns 22, 23 when workers 10 are working in the environments 8. In some examples, each of optical patterns 22, 23 may be embodied on a label or tag affixed to the corresponding PPE 13 or item 26 using an adhesive, clip, or other fastening means to be substantially immobile with respect to the PPE 13, item 26, or components thereof to which the optical pattern is affixed while workers 10 are working in environments 8. In such examples, optical patterns 22, 23 may be referred to as "optical tags" or "optical labels." Some examples of optical tags are approximately 4 cm×4 cm in dimension. Optical tags may be affixed to a variety of types of PPEs 13.

An optical tag having an optical pattern embodied thereon may be a retroreflective tag with a machine-readable code. The machine-readable code may be printed with infrared absorbing ink to enable an infrared camera to obtain images that can be readily processed to identify the machine-readable code. The optical tag may include an adhesive layer and a retroreflective sheeting layer printed with the machine-readable code. In some instances, the optical tag includes an additional mirror film layer that is laminated over the machine-readable code. The mirror film is infrared transparent such that the machine-readable code is not visible in ambient light but readily detectable within images obtained by an infrared camera (e.g., with some instances of image capture device 28). The machine-readable code may be a unique identifier within the scope of PPE managed by PPEMS 6. PPEMS 6 may use the machine-readable code to uniquely identify the optical tag 22, 23 and the corresponding PPE 13, component thereof, or item 26 to which the optical tag 22, 23 is affixed. An optical tag can be adhered to different types of PPE 13, such as protective eyewear, helmets, face shields, ear muffs, fall protection harness, coveralls, or respirators. Additional description of a mirror film is found in PCT Appl. No. PCT/US2017/014031, filed Jan. 19, 2017, which is incorporated by reference herein in its entirety.

In some examples, a PPE 13, component thereof, or item 26 is manufactured with an optical pattern 22, 23 embodied thereon. In some examples, an optical pattern 22, 23 may be printed, stamped, engraved, or otherwise embodied directly on a surface of the PPE 13, component thereof, or item 26. In some examples, a mix of types of embodiments of the optical patterns may be present in the environments. For example, optical pattern 23N may be printed on item 26, while optical pattern 22N is printed on a tag affixed to PPE 13N. Optical patterns 22A, 23A may both be printed on tags affixed to components of PPE 13A.

Each of optical patterns 22, 23 has a relative orientation with respect to its corresponding PPE 13, component of PPE 13, or item 26. In the illustrated example, optical pattern 22A has a relative orientation with respect to a helmet/hardhat of PPE 13A, optical pattern 23A has a relative orientation with respect to a visor of PPE 13A, optical pattern 22N has a relative orientation with respect to a helmet/hardhat of PPE 13N, and optical pattern 23N has a relative orientation with respect to item 26. Each pair of optical patterns 22, 23 has a relative orientation to one another and, by extension, this relative orientation is indicative of the relative orientation of the pair of PPE 13, components, or items to which the respective patterns from the pair of optical patterns 22, 23 are affixed. Each of optical patterns 22, 23 may visually indicate an orientation of the optical pattern. For example, an optical pattern may be such that a top or other side of the optical pattern may be readily visually identifiable regardless of the orientation in which the optical pattern is positioned. In this way, PPEMS 6 may determine from an image of an optical pattern an orientation of the optical pattern with respect to a coordinate system, e.g., a local coordinate system defined at least in part by an orientation of image capture device 28, or a global coordinate system. Further, PPEMS 6 may determine from an image of a first optical pattern and a second optical pattern a difference in between the orientations of the first optical pattern and the second optical pattern, which is the relative orientation between the first optical pattern and the second optical pattern.

In the illustrated example, for instance, the relative orientation of optical patterns 22A, 23A indicates the relative orientation of the helmet/hardhat of PPE 13A (to which optical pattern 22A is affixed) and the visor of PPE 13A (to which optical pattern 23A is affixed). The relative orientation of optical patterns 22N, 23N indicates the relative orientation of PPE 13N and item 26.

If an orientation of any of PPE 13, components thereof, or item 26 changes, the relative orientation of the corresponding pair of optical patterns 22, 23 changes. For example, a visor for PPE 13A raised in standby position results in a relative orientation for the pair of optical patterns 22A, 23A that is different than when the visor for PPE 13A is down in active position. Accordingly, the relative orientation of optical patterns 22A, 23A indicates whether the visor is in active or standby position.

Each pair of optical patterns 22, 23 also has a positional relation to one another. For example, each optical pattern for pair of optical patterns 22, 23 is positioned at any given time at a location in an environment 8. The positional relation defines a distance between the pair of optical patterns 22, 23. If a position of any of PPE 13, components thereof, or item 26 changes, the position relation of the corresponding pair of optical patterns 22, 23 changes. For example, if worker 10N wearing PPE 13N moves, the positional relation between pair of optical patterns 22N, 23N changes. The pair of optical patterns 22N, 23N may become closer or farther apart, for instance.

The relative orientation and positional relation between a pair of optical patterns 22, 23 are aspects of an overall spatial relation between the pair of optical patterns 22, 23. As explained above, the spatial relation between the pair of optical patterns 22, 23 indicates the spatial relation between the corresponding PPE 13, components thereof, or item on which the pair of optical patterns 22, 23 are embodied.

Image capture device 28 obtains and stores, at least temporarily, images 27A-27N of environment 8B. PPEMS 6 obtains images 27 from image capture device 28, e.g., via network 4, in near real-time for near real-time processing. Image capture device 28 may obtain multiple images 27A at a frequency at a position and orientation of image capture device 28. For instance, image capture device 28 may obtain an instance of image 27A once every second.

Image capture device 28 may be an optical camera, video camera, infrared or other non-human-visible spectrum camera, or a combination thereof. Image capture device 28 may be stationary or mobile with respect to environment 8B. For example, image capture device 28 may be a head-top camera worn by a worker or supervisor. An orientation of image capture device 28 may be fixed or moveable along one or more degrees of freedom. Image capture device 28 includes a wired or wireless communication link with PPEMS 6. For instance, image capture device 28 may transmit images 27 to PPEMS 6 or to a storage system (not shown in FIG. 1) via network 6. Alternatively, PPEMS 6 may read images 27 from a storage device for image capture device 28, or from the storage system (again, not shown in FIG. 1). Although only a single image capture device 28 is depicted, environment 8B may include multiple image capture devices 28 positioned about the environment 8B and oriented in different orientation in order to capture images of environment 8B from different positions and orientations, which results images that provide a more comprehensive view of the environment. As described herein, images generated by an image capture device 28 may refer to images generated by multiple image capture devices 28. The multiple image capture devices 28 may have known spatial inter-relations among them to permit determination of spatial relations between optical tags in respective images generated by respective image capture devices 28.

Images 27 may be optical images or infrared or other non-human-visible spectrum images. Images 27 include images of optical patterns 22, 23.

PPEMS 6 processes images 27 to identify optical patterns 22, 23. PPEMS 6 may process images 27 to identify the machine-readable codes of the optical patterns 22, 23. PPEMS 6 may process images 27 to determine a spatial relation between pairs of optical patterns 22, 23. To determine the spatial relation between pairs of optical patterns 22, 23, PPEMS 6 may determine, from one or more of the images, a position of each optical pattern and/or an orientation of each optical pattern with respect to a coordinate system. PPEMS 6 may also or alternative determine, from an image, a relative position of the pair of optical patterns 22, 23 and/or a relative orientation of the pair of optical patterns 22, 23.

For example, PPEMS 6 may process image 27A to determine the spatial relation between optical patterns 22A, 23A to identify a corresponding safety condition. The spatial relation, more particularly the relative orientation, may indicate that a visor of PPE 13A is in a closed, active position (as illustrated). Alternatively, the spatial relation may indicate that the visor is in an open, standby position such there exists a safety condition and, more specifically, a visor event.

As another example, PPEMS 6 may process image 27N to determine the spatial relation between optical patterns 22N, 23N to identify a corresponding safety condition. The spatial relation may indicate that PPE 13N (and by extension worker 10N) is a distance from item 26, e.g., 3 meters. The spatial relation may indicate the PPE 13N has a relative orientation to item 26, e.g., 90 degrees. The relative orientation between optical patterns 22N, 23N may indicate that worker 10N is prone and has experienced a fall, a trauma, and/or has swooned such that the worker 10N has had a worker-down event. The relative orientation may alternatively indicate that a helmet/hardhat PPE 13N is not positioned on the head of worker 10N, which may be a safety condition.

As another example, PPEMS 6 may process an image 27 to determine a spatial relation between a pair of optical patterns 22, 23 embodied on components of a hearing protection apparatus-type PPE 13 to identify a corresponding safety condition. The relative orientation of the pair of optical patterns may indicate that the ear muffs are positioned in a standby position, i.e., not positioned over the ears of a worker in environment 8 and thus incapable of attenuating sound for the worker wearing the PPE 13, indicative of a safety condition and, more specifically, a hearing protection event.

As another example, PPEMS 6 may process an image 27 to determine a spatial relation between a pair of optical patterns 22, 23 embodied on components of a respirator or other breathing protection apparatus-type PPE 13 to identify a corresponding safety condition. The relative orientation of the pair of optical patterns may indicate that the respirator is positioned in a standby position, i.e., not positioned over the nose of a worker in environment 8 and thus incapable of providing safe breathable air for the worker wearing the PPE 13, indicative of a safety condition and, more specifically, a respirator protection event.

Other examples involving other types of PPE 13 are contemplated.

In some examples, PPEMS 6 may use a spatial relation between one pair of optical patterns 22, 23 for a PPE 13 and a spatial relation between another pair of optical patterns 22, 23 to determine whether a safety condition exists for a worker. For example, PPEMS 6 may process images 27A, 27N (or a single image 27 having images of optical patterns 22A, 23A, and 23N) to determine a spatial relation between optical pattern 22A and 23N. The spatial relation may indicate that worker 10A wearing PPE 13A is positioned within a threshold distance for a proximity hazard associated with item 26. For instance, item 26 may be a welding station and workers within the threshold distance may experience eye damage if not protected by appropriate PPE. If PPE 13A is a welding mask, PPEMS 6 may process images of optical patterns 22A, 23A to determine (1) from a machine-readable code of one of optical patterns 22A, 23A that PPE 13A is a welding mask, and (2) a spatial relation between optical patterns 22A, 23A. If the spatial relation indicates the welding mask is in an open, standby position, this may indicate a safety condition and PPEMS 6 may output a visor event or perform another operation in response to the safety condition.

Other spatial relation combinations of optical patterns 22, 23 are contemplated, such as proximity hazards associated with force-induced trauma, lacerations, heat, noxious gases, falls, noise, and so forth, and the corresponding types of PPEs 13 intended to mitigate the dangers from such hazards.

In response to identifying the presence or absence of a safety condition, PPEMS 6 may output an event to notify a worker 10 or supervisor, shutdown a machine, or perform another operation. By identifying safety conditions using optical patterns in captured images 27 of PPEs 13, the techniques may be more versatile and widely applicable than using devices tied to the PPEs 13, such as sensors, locks, barriers, or other devices for indicating or ensuring an operational status of the PPE 13 (e.g., open vs. closed) or for indicating an unsafe spatial relationship between a PPE 13 and another apparatus. As another example, workers 10 may be less able to defeat the safety techniques described herein. As a still further example, the PPEMS 6 applying techniques described herein may be able to determine a safety condition for a PPE 13 without requiring a communication session or channel with the PPE 13, unlike other systems that may rely on receiving a communication signal from a PPE 13 indicating an operational status of the PPE 13. This may reduce a cost and/or improve a reliability of system 2 over other systems that rely on explicit communication. Furthermore, in some instances, the PPEMS 6 may be able to process a captured image that includes images of multiple PPEs 13 and respective optical patterns, which allows the PPEMS 6 to concurrently process and identify potential safety for the multiple PPEs 13 without having to process communication signals from each of the PPEs 13.

Figure 2:
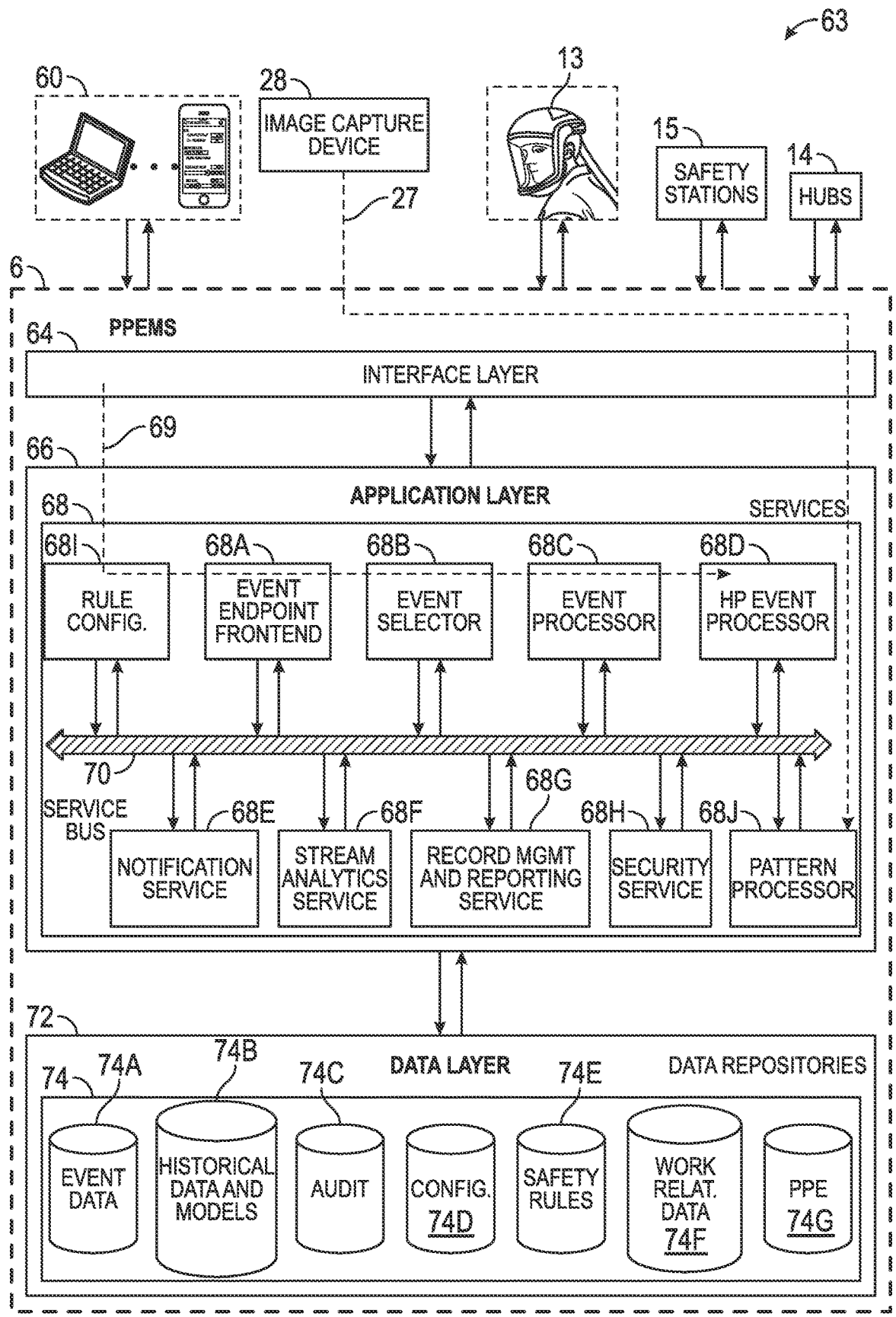
FIG. 2 is a block diagram illustrating, in detail, an operating perspective of the PPEMS shown in FIG. 1.

FIG. 2 is a block diagram providing an operating perspective of PPEMS 6 when hosted as cloud-based platform capable of supporting multiple, distinct work environments 8 having an overall population of workers 10 that have a variety of communication enabled personal protective equipment (PPE) 13, in accordance with techniques described herein. In the example of FIG. 2, the components of PPEMS 6 are arranged according to multiple logical layers that implement the techniques of the disclosure. Each layer may be implemented by one or more modules comprised of hardware, software, or a combination of hardware and software.

In FIG. 2, personal protective equipment (PPEs) 13 and/or other equipment, either directly or by way of HUBs 14, safety stations 15, as well as computing devices 60, operate as clients 63 that communicate with PPEMS 6 via interface layer 64. Computing devices 60 typically execute client software applications, such as desktop applications, mobile applications, and web applications. Computing devices 60 may represent any of computing devices 16, 18 of FIG. 1. Examples of computing devices 60 may include, but are not limited to a portable or mobile computing device (e.g., smartphone, wearable computing device, tablet), laptop computers, desktop computers, smart television platforms, and servers, to name only a few examples.

Some types or instances of PPEs 13 may communicate with PPEMS 6 (directly or via hubs 14) to provide streams of data acquired from embedded sensors and other monitoring circuitry and receive from PPEMS 6 alerts, configuration and other communications. However, a PPE 13 need not be able to communicate with PPEMS 6 to have one or more optical patterns embodied thereon and usable by PPEMS 6 to identify a safety condition associated with the PPE.

Client applications executing on computing devices 60 may communicate with PPEMS 6 to send and receive information that is retrieved, stored, generated, and/or otherwise processed by services 68. For instance, the client applications may request and edit safety event information including analytical data stored at and/or managed by PPEMS 6. In some examples, client applications may request and display aggregate safety event information that summarizes or otherwise aggregates numerous individual instances of safety events and corresponding data obtained from PPEs 13 and/or generated by PPEMS 6. The client applications may interact with PPEMS 6 to query for analytics information about past and predicted safety events, behavior trends of workers 10, to name only a few examples. In some examples, the client applications may output for display information received from PPEMS 6 to visualize such information for users of clients 63. As further illustrated and described in below, PPEMS 6 may provide information to the client applications, which the client applications output for display in user interfaces. Additional information is found in U.S. application Ser. No. 15/109, 564, filed Jun. 23, 2016, entitled "Indicating Hazardous Exposure in a Supplied Air Respirator System," which is incorporated herein by reference in its entirety.

Clients applications executing on computing devices 60 may be implemented for different platforms but include similar or the same functionality. For instance, a client application may be a desktop application compiled to run on a desktop operating system, such as Microsoft Windows, Apple OS X, or Linux, to name only a few examples. As another example, a client application may be a mobile application compiled to run on a mobile operating system, such as Google Android, Apple iOS, Microsoft Windows Mobile, or BlackBerry OS to name only a few examples. As another example, a client application may be a web application such as a web browser that displays web pages received from PPEMS 6. In the example of a web application, PPEMS 6 may receive requests from the web application (e.g., the web browser), process the requests, and send one or more responses back to the web application. In this way, the collection of web pages, the client-side processing web application, and the server-side processing performed by PPEMS 6 collectively provides the functionality to perform techniques of this disclosure. In this way, client applications use various services of PPEMS 6 in accordance with techniques of this disclosure, and the applications may operate within various different computing environment (e.g., embedded circuitry or processor of a PPE, a desktop operating system, mobile operating system, or web browser, to name only a few examples).

As shown in FIG. 2, PPEMS 6 includes an interface layer 64 that represents a set of application programming interfaces (API) or protocol interface presented and supported by PPEMS 6. Interface layer 64 initially receives messages from any of clients 63 for further processing at PPEMS 6. Interface layer 64 may therefore provide one or more interfaces that are available to client applications executing on clients 63. In some examples, the interfaces may be application programming interfaces (APIs) that are accessible over a network. Interface layer 64 may be implemented with one or more web servers. The one or more web servers may receive incoming requests, process and/or forward information from the requests to services 68, and provide one or more responses, based on information received from services 68, to the client application that initially sent the request. In some examples, the one or more web servers that implement interface layer 64 may include a runtime environment to deploy program logic that provides the one or more interfaces. As further described below, each service may provide a group of one or more interfaces that are accessible via interface layer 64.

In some examples, interface layer 64 may provide Representational State Transfer (RESTful) interfaces that use HTTP methods to interact with services and manipulate resources of PPEMS 6. In such examples, services 68 may generate JavaScript Object Notation (JSON) messages that interface layer 64 sends back to the client application 61 that submitted the initial request. In some examples, interface layer 64 provides web services using Simple Object Access Protocol (SOAP) to process requests from client applications 61. In still other examples, interface layer 64 may use Remote Procedure Calls (RPC) to process requests from clients 63. Upon receiving a request from a client application to use one or more services 68, interface layer 64 sends the information to application layer 66, which includes services 68.

As shown in FIG. 2, PPEMS 6 also includes an application layer 66 that represents a collection of services for implementing much of the underlying operations of PPEMS 6. Application layer 66 receives information included in requests received from client applications 61 and further processes the information according to one or more of services 68 invoked by the requests. Application layer 66 may be implemented as one or more discrete software services executing on one or more application servers, e.g., physical or virtual machines. That is, the application servers provide runtime environments for execution of services 68. In some examples, the functionality interface layer 64 as described above and the functionality of application layer 66 may be implemented at the same server.

Application layer 66 may include one or more separate software services 68, e.g., processes that communicate, e.g., via a logical service bus 70 as one example. Service bus 70 generally represents logical interconnections or set of interfaces that allows different services to send messages to other services, such as by a publish/subscription communication model. For instance, each of services 68 may subscribe to specific types of messages based on criteria set for the respective service. When a service publishes a message of a particular type on service bus 70, other services that subscribe to messages of that type will receive the message. In this way, each of services 68 may communicate information to one another. As another example, services 68 may communicate in point-to-point fashion using sockets or other communication mechanisms. Before describing the functionality of each of services 68, the layers are briefly described herein.

Data layer 72 of PPEMS 6 represents a data repository that provides persistence for information in PPEMS 6 using one or more data repositories 74. A data repository, generally, may be any data structure or software that stores and/or manages data. Examples of data repositories include but are not limited to relational databases, multi-dimensional databases, maps, and hash tables, to name only a few examples. Data layer 72 may be implemented using Relational Database Management System (RDBMS) software to manage information in data repositories 74. The RDBMS software may manage one or more data repositories 74, which may be accessed using Structured Query Language (SQL). Information in the one or more databases may be stored, retrieved, and modified using the RDBMS software. In some examples, data layer 72 may be implemented using an Object Database Management System (ODBMS), Online Analytical Processing (OLAP) database or other suitable data management system.

As shown in FIG. 2, each of services 68A-68J ("services 68") is implemented in a modular form within PPEMS 6. Although shown as separate modules for each service, in some examples the functionality of two or more services may be combined into a single module or component. Each of services 68 may be implemented in software, hardware, or a combination of hardware and software. Moreover, services 68 may be implemented as standalone devices, separate virtual machines or containers, processes, threads or software instructions generally for execution on one or more physical processors.

In some examples, one or more of services 68 may each provide one or more interfaces that are exposed through interface layer 64. Accordingly, client applications of computing devices 60 may call one or more interfaces of one or more of services 68 to perform techniques of this disclosure.

In accordance with techniques of the disclosure, services 68 may include an event processing platform including a pattern processor service 68J and an event endpoint frontend 68A, event selector 68B, event processor 68C and high priority (HP) event processor 68D.

Pattern processor service 68J obtains images 27 generated by image capture device 28 and processes images 27 to identify safety conditions and, in some cases, to generate events based on the safety conditions. Pattern service 68J may add generated events to event streams 29 for processing by other services, as described below.

Event endpoint frontend 68A operates as a frontend interface for exchanging communications with hubs 14 and in some cases with one or more of PPEs 13. In other words, event endpoint frontend 68A operates to as a frontline interface to safety equipment deployed within environments 8 and utilized by workers 10. In some instances, event endpoint frontend 68A may be implemented as a plurality of tasks or jobs spawned to receive individual inbound communications of event streams 69 from the PPEs 13 carrying data sensed and captured by the safety equipment. When receiving event streams 69, for example, event endpoint frontend 68A may spawn tasks to quickly enqueue an inbound communication, referred to as an event, and close the communication session, thereby providing high-speed processing and scalability. Each incoming communication may, for example, carry data recently captured data representing sensed conditions, motions, temperatures, actions or other data, generally referred to as events. Communications exchanged between the event endpoint frontend 68A and the PPEs 13/hubs 14 may be real-time or pseudo real-time depending on communication delays and continuity.

Event selector 68B operates on the stream of events 69 received from PPEs 13 and/or hubs 14 via frontend 68A and determines, based on rules or classifications, priorities associated with the incoming events. Based on the priorities, event selector 68B enqueues the events for subsequent processing by event processor 68C or high priority (HP) event processor 68D. Additional computational resources and objects may be dedicated to HP event processor 68D so as to ensure responsiveness to critical events, such as incorrect usage of PPEs, use of incorrect filters and/or respirators based on geographic locations and conditions, failure to properly secure SRLs 11 and the like. Responsive to processing high priority events, HP event processor 68D may immediately invoke notification service 68E to generate alerts, instructions, warnings or other similar messages to be output to PPEs 13, hubs 14, or devices used by users 20, 24. Events not classified as high priority are consumed and processed by event processor 68C.

In general, event processor 68C or high priority (HP) event processor 68D operate on the incoming streams of events to update event data 74A within data repositories 74. In general, event data 74A may include all or a subset of usage data generated by pattern service 68J or by PPEs 13. For example, in some instances, event data 74A may include entire streams of samples of data obtained from electronic sensors of PPEs 13. In other instances, event data 74A may include a subset of such data, e.g., associated with a particular time period or activity of PPEs 13. Event data 74 generated by pattern service 68J may include a description of a safety condition identified by pattern service. Alternatively, such event data may include a stream of data describing spatial relations between pairs of optical patterns over time for further processing by event processors 68C, 68D, as well as stream analytics service 68F in some cases.

Event processors 68C, 68D may create, read, update, and delete event information stored in event data 74A. Event information for may be stored in a respective database record as a structure that includes name/value pairs of information, such as data tables specified in row/column format. For instance, a name (e.g., column) may be "worker ID" and a value may be an employee identification number. An event record may include information such as, but not limited to: worker identification, PPE identification, acquisition timestamp(s) and data indicative of one or more sensed parameters.

In addition, event selector 68B directs the incoming stream of events to stream analytics service 68F, which is configured to perform in depth processing of the incoming stream of events to perform real-time analytics. Stream analytics service 68F may, for example, be configured to process and compare multiple streams of event data 74A with historical data and models 74B in real-time as event data 74A is received. In this way, stream analytic service 68D may be configured to detect anomalies, transform incoming event data values, trigger alerts upon detecting safety concerns based on conditions or worker behaviors. Historical data and models 74B may include, for example, specified safety rules, business rules and the like. In addition, stream analytic service 68D may generate output for communicating to PPEs 13 by notification service 68F or computing devices 60 by way of record management and reporting service 68D.

In this way, analytics service 68F may process inbound streams of events, potentially hundreds or thousands of streams of events to apply historical data and models 74B to compute assertions, such as identified anomalies or predicted occurrences of imminent safety events based on conditions or behavior patterns of the workers. Analytics service 68F publish the assertions to notification service 68F and/or record management by service bus 70 for output to any of clients 63.

In this way, analytics service 68F may be configured as an active safety management system that predicts imminent safety concerns and provides real-time alerting and reporting. In addition, analytics service 68F may be a decision support system that provides techniques for processing inbound streams of event data to generate assertions in the form of statistics, conclusions, and/or recommendations on an aggregate or individualized worker and/or PPE basis for enterprises, safety officers and other remote users. For instance, analytics service 68F may apply historical data and models 74B to determine, for a particular worker, the likelihood that a safety event is imminent for the worker based on detected behavior or activity patterns, environmental conditions and geographic locations. In some examples, analytics service 68F may determine whether a worker is currently impaired, e.g., due to exhaustion, sickness or alcohol/drug use, and may require intervention to prevent safety events. As yet another example, analytics service 68F may provide comparative ratings of workers or type of safety equipment in a particular environment 8.

Hence, analytics service 68F may maintain or otherwise use one or more models that provide risk metrics to predict safety events. Analytics service 68F may also generate order sets, recommendations, and quality measures. In some examples, analytics service 68F may generate user interfaces based on processing information stored by PPEMS 6 to provide actionable information to any of clients 63. For example, analytics service 68F may generate dashboards, alert notifications, reports and the like for output at any of clients 63. Such information may provide various insights regarding baseline ("normal") operation across worker populations, identifications of any anomalous workers engaging in abnormal activities that may potentially expose the worker to risks, identifications of any geographic regions within environments for which unusually anomalous (e.g., high) safety events have been or are predicted to occur, identifications of any of environments exhibiting anomalous occurrences of safety events relative to other environments, and the like.

Although other technologies can be used, in one example implementation, analytics service 68F utilizes machine learning when operating on streams of safety events so as to perform real-time analytics. That is, analytics service 68F includes executable code generated by application of machine learning to training data of event streams and known safety events to detect patterns. The executable code may take the form of software instructions or rule sets and is generally referred to as a model that can subsequently be applied to event streams 69 for detecting similar patterns and predicting upcoming events.

Analytics service 68F may, in some example, generate separate models for a particular worker, a particular population of workers, a particular environment, or combinations thereof. Analytics service 68F may update the models based on usage data received from PPEs 13. For example, analytics service 68F may update the models for a particular worker, a particular population of workers, a particular environment, or combinations thereof based on data received from PPEs 13.

Alternatively, or in addition, analytics service 68F may communicate all or portions of the generated code and/or the machine learning models to hubs 16 (or PPEs 13) for execution thereon so as to provide local alerting in near-real time to PPEs. Example machine learning techniques that may be employed to generate models 74B can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms and the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbor (kNN), Learning Vector Quantization (LUQ), Self-Organizing Map (SOM), Locally Weighted Learning (LWL), Ridge Regression, Least Absolute Shrinkage and Selection Operator (LASSO), Elastic Net, and Least-Angle Regression (LARS), Principal Component Analysis (PCA) and Principal Component Regression (PCR).

Record management and reporting service 68G processes and responds to messages and queries received from computing devices 60 via interface layer 64. For example, record management and reporting service 68G may receive requests from client computing devices for event data related to individual workers, populations or sample sets of workers, geographic regions of environments 8 or environments 8 as a whole, or individual or groups/types of PPEs 13. In response, record management and reporting service 68G accesses event information based on the request. Upon retrieving the event data, record management and reporting service 68G constructs an output response to the client application that initially requested the information. In some examples, the data may be included in a document, such as an HTML document, or the data may be encoded in a JSON format or presented by a dashboard application executing on the requesting client computing device. For instance, as further described in this disclosure, example user interfaces that include the event information are depicted in the figures.

As additional examples, record management and reporting service 68G may receive requests to find, analyze, and correlate PPE event information. For instance, record management and reporting service 68G may receive a query request from a client application for event data 74A over a historical time frame, such as a user can view PPE event information over a period of time and/or a computing device can analyze the PPE event information over the period of time.

In example implementations, services 68 may also include security service 68H that authenticate and authorize users and requests with PPEMS 6. Specifically, security service 68H may receive authentication requests from client applications and/or other services 68 to access data in data layer 72 and/or perform processing in application layer 66. An authentication request may include credentials, such as a username and password. Security service 68H may query security data 74A to determine whether the username and password combination is valid. Configuration data 74D may include security data in the form of authorization credentials, policies, and any other information for controlling access to PPEMS 6. As described above, security data 74A may include authorization credentials, such as combinations of valid usernames and passwords for authorized users of PPEMS 6. Other credentials may include device identifiers or device profiles that are allowed to access PPEMS 6.

Security service 68H may provide audit and logging functionality for operations performed at PPEMS 6. For instance, security service 68H may log operations performed by services 68 and/or data accessed by services 68 in data layer 72. Security service 68H may store audit information such as logged operations, accessed data, and rule processing results in audit data 74C. In some examples, security service 68H may generate events in response to one or more rules being satisfied. Security service 68H may store data indicating the events in audit data 74C.

In the example of FIG. 2, a safety manager may initially configure one or more safety rules. As such, remote user 24 may provide one or more user inputs at computing device 18 that configure a set of safety rules for work environments 8A and 8B. For instance, a computing device 60 of the safety manager may send a message that defines or specifies the safety rules. Such message may include data to select or create conditions and actions of the safety rules. PPEMS 6 may receive the message at interface layer 64 which forwards the message to rule configuration component 681. Rule configuration component 681 may be combination of hardware and/or software that provides for rule configuration including, but not limited to: providing a user interface to specify conditions and actions of rules, receive, organize, store, and update rules included in safety rules data store 74E.

Safety rules data store 74E may be a data store that includes data representing one or more safety rules. Safety rules data store 74E may be any suitable data store such as a relational database system, online analytical processing database, object-oriented database, or any other type of data store. When rule configuration component 681 receives data defining safety rules from computing device 60 of the safety manager, rule configuration component 681 may store the safety rules in safety rules data store 74E.

In some examples, storing the safety rules may include associating a safety rule with context data, such that rule configuration component 681 may perform a lookup to select safety rules associated with matching context data. Context data may include any data describing or characterizing the properties or operation of a worker, worker environment, article of PPE, or any other entity. Context data may include any data describing an optical pattern, optical tag, or optical label, or associating the optical pattern with (1) a specific PPE, (2) a type of PPE, (3) another optical pattern, and/or (4) a specific worker. Context data of a worker may include, but is not limited to: a unique identifier of a worker, type of worker, role of worker, physiological or biometric properties of a worker, experience of a worker, training of a worker, time worked by a worker over a particular time interval, location of the worker, or any other data that describes or characterizes a worker. Context data of an article of PPE may include, but is not limited to: a unique identifier of the article of PPE; a type of PPE of the article of PPE; a usage time of the article of PPE over a particular time interval; a lifetime of the PPE; a component included within the article of PPE; a usage history across multiple users of the article of PPE; contaminants, hazards, or other physical conditions detected by the PPE, expiration date of the article of PPE; operating metrics of the article of PPE; one or more optical patterns embodied on the article of PPE. Context data for a work environment may include, but is not limited to: a location of a work environment, a boundary or perimeter of a work environment, an area of a work environment, hazards within a work environment, physical conditions of a work environment, permits for a work environment, equipment within a work environment, owner of a work environment, responsible supervisor and/or safety manager for a work environment.

Table 1, shown below, includes a non-limiting set of rules that may be stored to safety rules data store 74E:

TABLE 1

SAFETY RULES

Hub shall immediately assert an "Attention Initial" Alert if Visor Position Status is OPEN in current location requiring Visor Open Allow = NO
Hub shall immediately assert a "Critical Initial" Alert if Filter Type Status is not equal to Filter Type or no filter found required by current location
Hub shall store all alerts in a queue.
Critical Alerts shall be highest priority in alert queue
Attention Alerts shall have secondary priority in alert queue
Hub shall immediately remove an alert from the queue if its conditions causing the alert have been corrected
A newly added alert to the alert queue shall be flagged as "Active", if it is higher priority than any other alarms in the queue.
A newly added alert to the alert queue shall be flagged as "Active", if all other alarms in the queue are Acknowledged or Notify
A newly added alert to the alert queue shall be flagged as "Pending" if an Active alert already exists in the queue and the newly added alert is lower in priority than the currently Active alert
If an Active alert in the queue is replaced by a new Active alert because of priority, the replaced alert shall be flagged as "Pending"
An active alert shall enable its respective haptic feedback and LED pattern
Hub shall assert an Acknowledge event when user presses and releases button within <3 seconds. (Button_Tap)
Upon an Acknowledge event the Hub shall immediately flag the currently Active alert as Acknowledged, if any Active alerts are in the queue.
An Acknowledged alert shall disable its respective haptic feedback and LED pattern
Upon an Acknowledge event the Hub shall immediately flag the highest priority Pending alert as Active, if any Pending alerts exist in the queue.
Upon an Acknowledge event the Hub shall immediately flag the highest priority Acknowledged alert as Notify, if no Active alerts or Pending exist in the queue.
A Notify alert shall disable its respective haptic feedback and enable its LED pattern
Immediate Cloud Updates - Hub shall send safety violation asserted message via Wi-Fi to cloud service immediately upon assertion of alert
Immediate Worker Interface Updates - Hub shall send safety rule violation alerts asserted message via BLE to Worker Interface immediately upon assertion of alert
Immediate Cloud Updates - Hub shall send safety violation deasserted message via Wi-Fi to cloud service immediately upon deassertion of alert
Immediate Worker Interface Updates - Hub shall send safety violation deasserted message via BLE to Worker Interface immediately upon deassertion of alert It should be understood that the above examples of table 1 are provided for purposes of illustration only, and that other rules may be developed.

According to aspects of this disclosure, the rules may be used for purposes of reporting, to generate alerts, or the like. In an example for purposes of illustration, worker 10A may be equipped with PPE 13A and data hub 14A. Data hub 14A may be initially configured with and store a unique identifier of worker 10A. When initially assigning the PPE 13A and data hub to worker 10A, a computing device operated by worker 10A and/or a safety manager may cause RMRS 68G to store a mapping in work relation data 74F. Work relation data 74F may include mappings between data that corresponds to PPE, workers, and work environments. Work relation data 74F may be any suitable datastore for storing, retrieving, updating and deleting data. RMRS 68G may store a mapping between the unique identifier of worker 10A and a unique device identifier of data hub 14A. Work relation data store 74F may also map a worker to an environment.

Worker 10A may initially put on PPE 13A and data hub 14A prior to entering environment 8A. As worker 10A approaches environment 8A and/or has entered environment 8A, data hub 14A may determine that worker 10A is within a threshold distance of entering environment 8A or has entered environment 8A. Data hub 14A may determine that it is within a threshold distance of entering environment 8A or has entered environment 8A and send a message that includes context data to PPEMS 6 that indicates data hub 14A is within a threshold distance of entering environment 8A.

PPEMS 6 may additionally or alternatively apply analytics to predict the likelihood of a safety event. As noted above, a safety event may refer to activities of a worker 10 using PPE 13, a condition of PPE 13, or a hazardous environmental condition (e.g., that the likelihood of a safety event is relatively high, that the environment is dangerous, that a PPE 13 is malfunctioning, that one or more components of the PPE should be repaired or replaced, or the like). For example, PPEMS 6 may determine the likelihood of a safety event based on application of usage data from PPE 13 to historical data and models 74B. That is, PPEMS 6 may apply historical data and models 74B to usage data from PPE 13 in order to compute assertions, such as anomalies or predicted occurrences of imminent safety events based on environmental conditions or behavior patterns of a worker using a PPE 13.

PPEMS 6 may apply analytics to identify relationships or correlations between sensed data from PPE 13, environmental conditions of environment in which PPE 13 is located, a geographic region in which PPE 13 are located, and/or other factors. PPEMS 6 may determine, based on the data acquired across populations of workers 10, which particular activities, possibly within certain environment or geographic region, lead to, or are predicted to lead to, unusually high occurrences of safety events. PPEMS 6 may generate alert data based on the analysis of the usage data and transmit the alert data to PPEs 13 and/or hubs 14. Hence, according to aspects of this disclosure, PPEMS 6 may determine usage data of PPEs 13, generate status indications, determine performance analytics, and/or perform prospective/preemptive actions based on a likelihood of a safety event.

For example, according to aspects of this disclosure, pattern service 68J may generate usage data for PPE 13 using the optical pattern identification and spatial relation techniques described herein. For example, PPEMS 6 may determine, based on streams of spatial relation data for one or more optical patterns associated with a PPE 13, a length of time that one or more components have been in use, an instantaneous velocity or acceleration of worker 10 (e.g., based on an accelerometer included in PPE 13 or hubs 14), location(s) of worker 10, a number of times or frequency with which a worker 10 has performed a self-check of PPE 13 or other PPE, a number of times and lengths of times a visor or other component of PPE 13 has been placed into active or standby position, or the like.

According to aspects of this disclosure, PPEMS 6 may use the usage data to characterize activity of worker 10. For example, PPEMS 6 may establish patterns of productive and nonproductive time (e.g., based on operation of PPE 13 and/or movement of worker 10), categorize worker movements, identify key motions, and/or infer occurrence of key events. That is, PPEMS 6 may obtain the usage data, analyze the usage data using services 68 (e.g., by comparing the usage data to data from known activities/events), and generate an output based on the analysis.

The usage statistics may be used to provide an understanding how PPE 13 are used by workers 10 to product developers in order to improve product designs and performance. In still other examples, the usage statistics may be used to gather human performance metadata to develop product specifications. In still other examples, the usage statistics may be used as a competitive benchmarking tool. For example, usage data may be compared between customers of PPE 13 to evaluate metrics (e.g. productivity, compliance, or the like) between entire populations of workers outfitted with PPE 13.

Additionally or alternatively, according to aspects of this disclosure, spatial relation data may be used to assess performance of worker 10 wearing a PPE 13. For example, PPEMS 6 may, based on spatial relation data, recognize motion that may indicate a pending fall by worker 10 (e.g., by determining a movement between an optical pattern embodied on the PPE 13 and another optical pattern in environment 8). In some instances, PPEMS 6 may, based on spatial relation data, infer that a fall has occurred or that worker 10 is incapacitated. PPEMS 6 may also perform fall data analysis after a fall has occurred and/or determine temperature, humidity and other environmental conditions as they relate to the likelihood of safety events.

As another example, PPEMS 6 may, based on spatial relation data, recognize motion that may indicate fatigue or impairment of worker 10. For example, PPEMS 6 may apply spatial relation data from PPE 13 to a safety model that characterizes a motion of a worker 10. In this example, PPEMS 6 may determine that the motion of a worker 10 over a time period is anomalous for the worker 10 or a population of workers 10 using a PPE 13.

Additionally or alternatively, according to aspects of this disclosure, usage data from PPE 13 may be used to determine alerts and/or actively control operation of PPE 13. For example, PPEMS 6 may determine that a safety condition is present. PPEMS 6 may send data to PPE 13 to change an operating condition of PPE 13. In an example for purposes of illustration, PPEMS 6 may apply usage data to a safety model that characterizes an expenditure of a filter of one of PPE 13. In this example, PPEMS 6 may determine that the expenditure is higher than an expected expenditure for an environment, e.g., based on conditions sensed in the environment, usage data gathered from other workers 10 in the environment, or the like. PPEMS 6 may generate and transmit an alert to worker 10 that indicates that worker 10 should leave the environment.

PPEMS 6 may generate, in some examples, a warning when worker 10 is near a hazard in one of environments 8 (e.g., based on spatial relation data).

Again, PPEMS 6 may determine the above-described performance characteristics and/or generate the alert data based on application of the spatial relation data to one or more safety models that characterizes activity of a user of a type of PPE 13. The safety models may be trained based on historical data or known safety events. However, while the determinations are described with respect to PPEMS 6, as described in greater detail herein, one or more other computing devices, such as hubs 14 or PPE 13 may be configured to perform all or a subset of such functionality.

In some instances, PPEMS 6 may apply analytics for combinations of PPE. For example, PPEMS 6 may draw correlations between users of PPE 13 and/or the other PPE (such as fall protective equipment, head protective equipment, hearing protective equipment, or the like) that is used with PPE 13. That is, in some instances, PPEMS 6 may determine the likelihood of a safety event based not only on spatial relation and or usage data from PPE 13, but also from data for other PPE being used with PPE 13. In such instances, PPEMS 6 may include one or more safety models that are constructed from data of known safety events from one or more devices other than PPE 13 that are in use with PPE 13.

In general, while certain techniques or functions are described herein as being performed by certain components, e.g., PPEMS 6, PPE 13, or hubs 14, it should be understood that the techniques of this disclosure are not limited in this way. That is, certain techniques described herein may be performed by one or more of the components of the described systems. For example, in some instances, PPE 13 may have a limited or no sensor set and/or processing power. In such instances, one or more of of hubs 14 and/or PPEMS 6 may responsible for most or all of the processing of usage data, determining the likelihood of a safety event, and the like. In other examples, PPE 13 and/or hubs 14 may have additional sensors, additional processing power, and/or additional memory, allowing for PPE 13 and/or hubs 14 to perform additional techniques. Determinations regarding which components are responsible for performing techniques may be based, for example, on processing costs, financial costs, power consumption, or the like.

Figure 3:
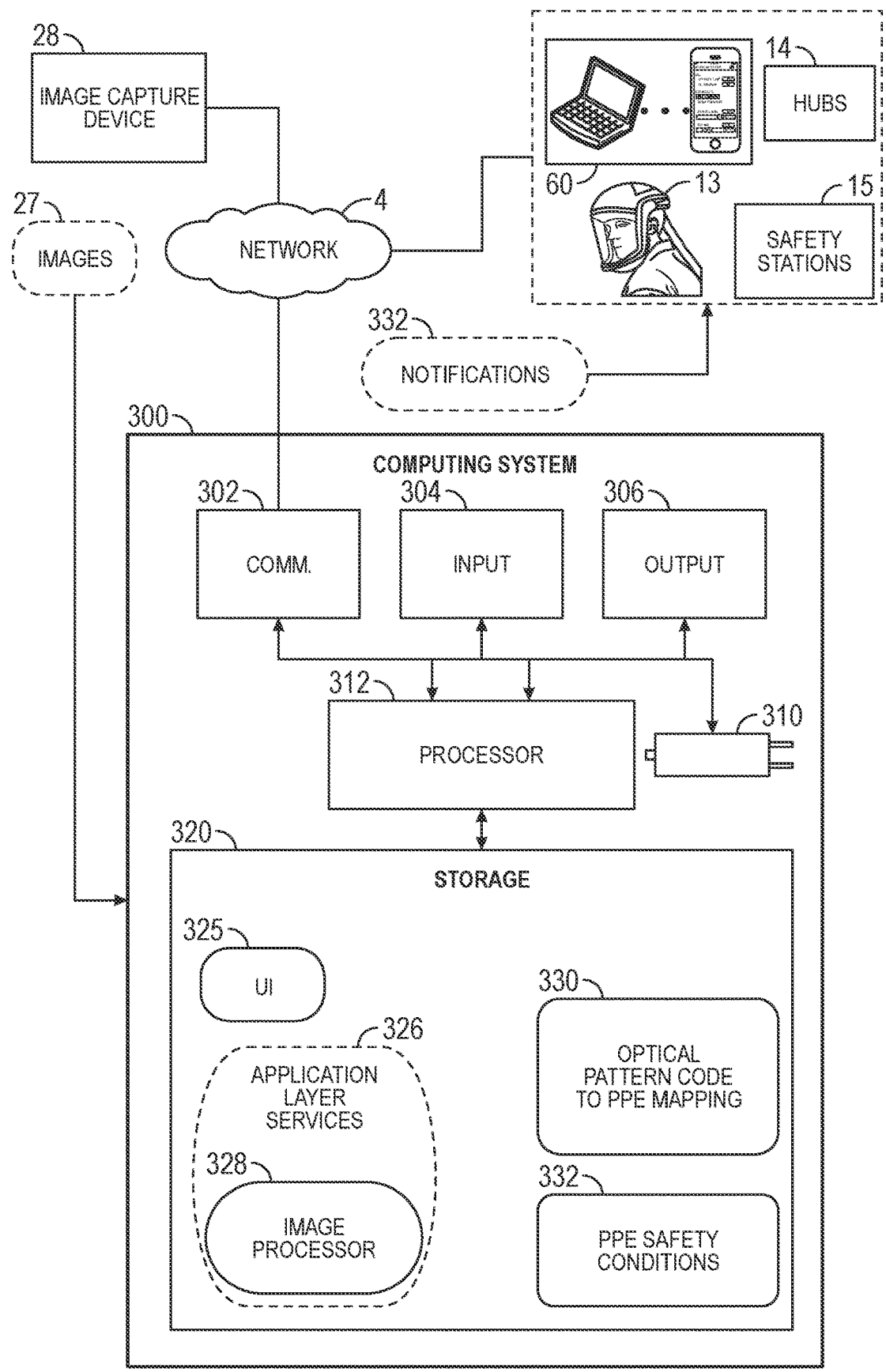
FIG. 3 is a block diagram illustrating, in detail, an example computing device for a PPEMS, according to techniques of this disclosure.

FIG. 3 is a block diagram of a personal protective equipment management system, according to techniques described herein. Computing system 300 of FIG. 3 is described below as an example or alternate implementation of PPEMS 6 of FIGS. 1-2. Other examples may be used or may be appropriate in some instances. Although computing system 300 may be a stand-alone device, computing system 300 may take many forms, and may be, or may be part of, any component, device, or system that includes a processor or other suitable computing environment for processing information or executing software instructions. In some examples, computing system 300, or components thereof, may be fully implemented as hardware in one or more devices or logic elements. Computing system 300 may represent multiple computing servers operating as a distributed system to perform the functionality described with respect to a PPEMS 6.

Computing system 300 may include one or more communication units 302, one or more input devices 304, one or more output devices 306, power source 310, one or more processors 312, and one or more storage devices 320. One or more storage devices 320 may store user interface module 325, application layer services 326 including pattern service 328, optical pattern code to PPE mapping structure 330 and PPE safety conditions structure 332. One or more of the devices, modules, storage areas, or other components of computing system 300 may be interconnected to enable inter-component communications (physically, communicatively, and/or operatively). In some examples, such connectivity may be provided by through system bus, a network connection, an inter-process communication data structure, or any other method for communicating data.

Power source 310 may provide power to one or more components of computing system 300. In some examples, power source 310 may be a battery. In other examples, power source 310 may receive power from the primary alternative current (AC) power supply in a building, home, or other location. In still further examples, computing system 300 and/or power source 310 may receive power from another source.

One or more input devices 304 of computing system 300 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine. One or more output devices 306 of computing system 300 may generate, transmit, or process output. Examples of output are tactile, audio, visual, and/or video output. Output devices 306 may include a display, sound card, video graphics adapter card, speaker, presence-sensitive screen, one or more USB interfaces, video and/or audio output interfaces, or any other type of device capable of generating tactile, audio, video, or other output. Output devices 306 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of device for generating tactile, audio, and/or visual output. In some examples, computing system 300 may include a presence-sensitive display that may serve as a user interface device that operates both as one or more input devices 304 and one or more output devices 306.

One or more communication units 302 of computing system 300 may communicate with devices external to computing system 300 by transmitting and/or receiving data, and may operate, in some respects, as both an input device and an output device. In some examples, communication unit 302 may communicate with other devices over a network, e.g., image capture device 28 (or a storage device storing images generated by image capture device 28), computing devices 60, hubs 14, some instances of PPEs 13, and/or safety stations 15. In other examples, one or more communication units 302 may send and/or receive radio signals on a radio network such as a cellular radio network. In other examples, one or more communication units 302 may transmit and/or receive satellite signals on a satellite network such as a Global Positioning System (GPS) network. Examples of one or more communication units 302 may include a network interface card (e.g. such as an Ethernet card), an optical transceiver, a radio frequency transceiver, a GPS receiver, or any other type of device that can send and/or receive information. Other examples of one or more communication units 302 may include Bluetooth®, GPS, 3G, 4G, and Wi-Fi® radios found in mobile devices as well as Universal Serial Bus (USB) controllers and the like.

One or more processors 312 of computing system 300 may implement functionality and/or execute instructions associated with computing system 300. Examples of one or more processors 312 may include microprocessors, application processors, display controllers, auxiliary processors, one or more sensor hubs, and any other hardware configured to function as a processor, a processing unit, or a processing device. Computing system 300 may use one or more processors 312 to perform operations in accordance with one or more aspects of the present disclosure using software, hardware, firmware, or a mixture of hardware, software, and firmware residing in and/or executing at computing system 300.

One or more storage devices 320 within computing system 300 may store information for processing during operation of computing system 300. In some examples, one or more storage devices 320 are temporary memories, meaning that a primary purpose of the one or more storage devices is not long-term storage. One or more storage devices 320 on computing system 300 may be configured for short-term storage of information as volatile memory and therefore not retain stored contents if deactivated. Examples of volatile memories may include random access memories (RAM), dynamic random-access memories (DRAM), static random-access memories (SRAM), and other forms of volatile memories known in the art. One or more storage devices 320, in some examples, also include one or more computer-readable storage media. One or more storage devices 320 may be configured to store larger amounts of information than volatile memory. One or more storage devices 320 may further be configured for long-term storage of information as non-volatile memory space and retain information after activate/off cycles. Examples of non-volatile memories may include magnetic hard disks, optical discs, floppy disks, flash memories, or forms of electrically programmable memories (EPROM) or electrically erasable and programmable (EEPROM) memories. One or more storage devices 320 may store program instructions and/or data associated with one or more of the modules described in accordance with one or more aspects of this disclosure.

One or more processors 312 and one or more storage devices 320 may provide an operating environment or platform for one or one more modules, which may be implemented as software, but may in some examples include any combination of hardware, firmware, and software. One or more processors 312 may execute instructions and one or more storage devices 320 may store instructions and/or data of one or more modules. The combination of one or more processors 312 and one or more storage devices 320 may retrieve, store, and/or execute the instructions and/or data of one or more applications, modules, or software. One or more processors 312 and/or one or more storage devices 320 may also be operably coupled to one or more other software and/or hardware components, including, but not limited to, one or more of the components illustrated in FIG. 3.

One or more modules illustrated in FIG. 3 as being included within one or more storage devices 320 (or modules otherwise described herein) may perform operations described using software, hardware, firmware, or a mixture of hardware, software, and firmware residing in and/or executing at computing system 300. Computing system 300 may execute each of the module(s) with multiple processors or multiple devices. Computing system 300 may execute one or more of such modules as a virtual machine or container executing on underlying hardware. One or more of such modules may execute as one or more services of an operating system or computing platform. One or more of such modules may execute as one or more executable programs at an application layer of a computing platform.

One or more storage devices 320 stores optical pattern code to PPE mapping structure 330, a data structure that maps optical pattern codes to PPEs 13 having the codes embodied thereon. PPEs 13 may be identified using unique identifiers or by a type of PPE, for instance. In some examples, structure 330 maps pairs of optical pattern codes to PPEs 13 having at least one of the optical pattern codes embodied thereon. Structure 330 is an associative data structure and may represent, e.g, a database, table, list, or map.

One or more storage device 320 stores PPE safety conditions 332. PPE safety conditions include a list of rules defining safety conditions identifiable by spatial relations between pairs of optical patterns for PPEs 13 having at least one of the optical patterns embodied thereon. PPE safety conditions 332 may be implemented using a database, a list, a file, or other structure. PPE safety conditions 332 may be included in or an example of safety rules data store 74E of FIG. 2.

User interface (UI) module 325 for execution by processors 312 outputs, for display via output device(s) 306, a user interface to enable an operator to configure structures 330, 332. Input device(s) 304 receive user input including configuration data for optical pattern code to PPE mapping 330 and PPE safety conditions 332. User interface 325 processes the configuration data and updates the structures 330, 332 using the configuration data.

Application layer services 326 may represent an example instance of services 68 of FIG. 2. Pattern service 328 may represent an example instance of pattern service 68J of FIG. 2. Pattern service 328 for execution by processors 312 may output, via communication unit(s) 302, commands to read or otherwise obtain images 27 generated by image capture device 28. Pattern service 328 may temporarily store, to storage device(s) 320, a subset of images 27 for processing.

Pattern service 328 processes one or more images 27 to identify and determine a spatial relation between a pair of optical patterns in the one or more images. Pattern service 328 may apply image processing techniques to determine a spatial relation between the pair of optical patterns. For example, pattern service 328 may process the one or more images to determine orientations of each of the optical patterns in the one or more images and determine a relative orientation between the pair of optical patterns. As another example, pattern service 328 may use known dimensions for each of the optical patterns, as well as image capture properties of image capture device 28, to determine based on the one or more images 27 a distance between the pair of optical patterns.

Pattern service 328 may query a dataset of optical patterns to look up the optical pattern codes for the pair of optical patterns or, alternatively, pattern service 328 may derive the optical pattern codes from encodings embedded in the optical patterns. Based on optical pattern codes for the pair of optical patterns, pattern service 328 looks up an optical pattern code to PPE mapping in structure 330 and, using the mapping, maps at least one of the optical pattern codes to a PPE to identify a PPE 13 or type of PPE 13 having at least one of the optical patterns embodied thereon.

Based on this identification, pattern service 328 looks up a PPE safety condition for the identified PPE 13 or type of PPE 13 in PPE safety conditions 332. If the PPE safety condition for the identified PPE 13 or type of PPE 13 is satisfied by the spatial relation between the pair of optical patterns in the one or more images, pattern service 328 may perform an operation, such as storing an event, outputting a notification 332 via communication unit(s) 302, or outputting a command via communication unit(s) 302 to control a machine or PPE 13.

Figure 4A:
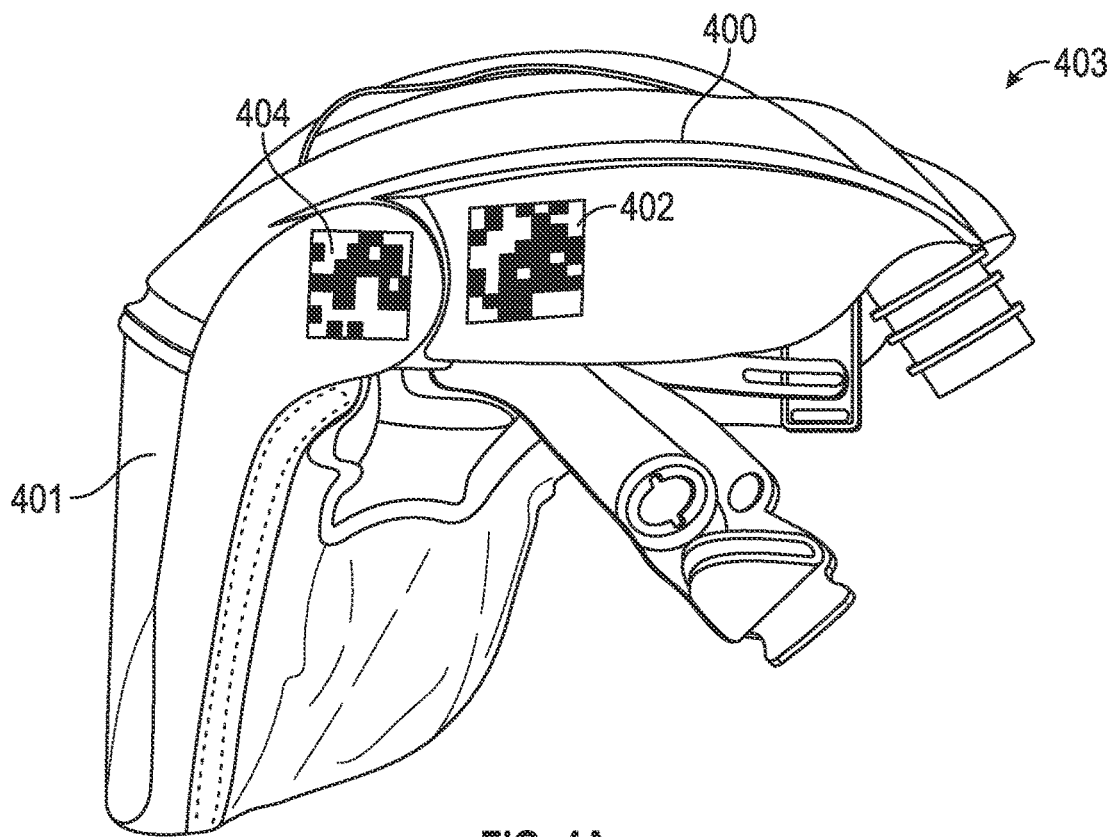
FIGS. 4A-4B depict an example of a PPE in an active and standby position, the PPE having optical patterns embodied thereon, according to techniques of this disclosure.
Figure 4B:
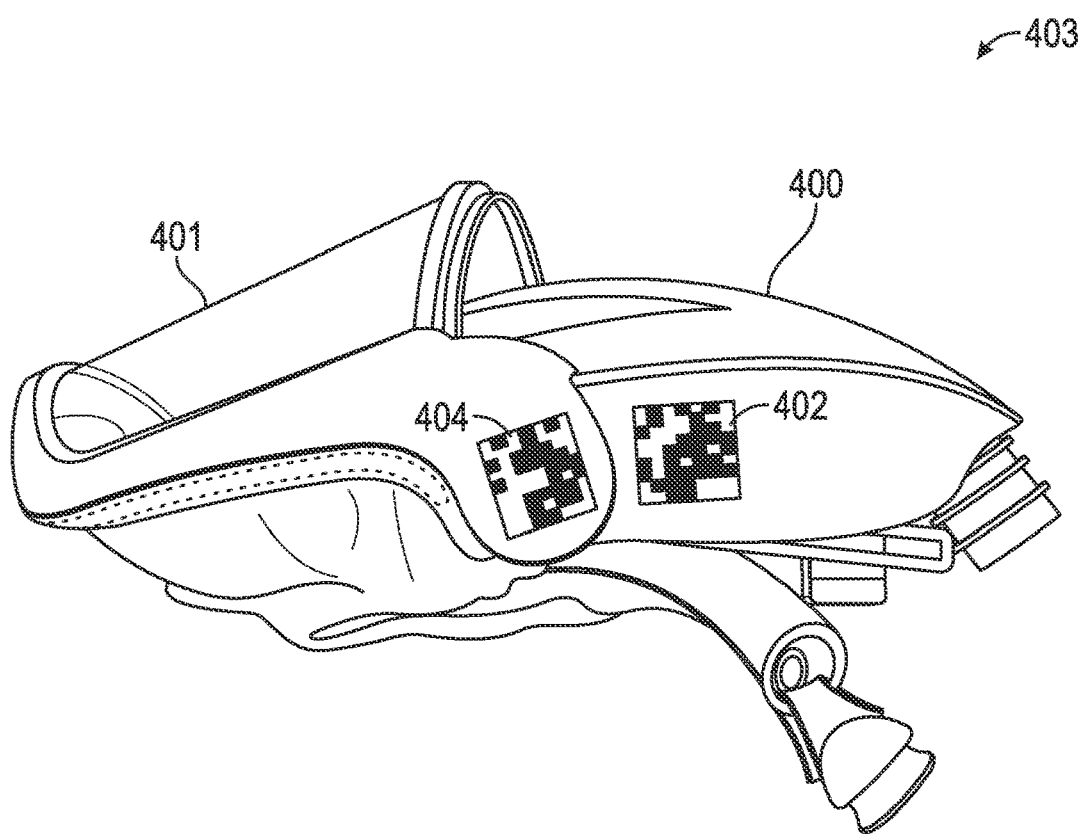

FIGS. 4A-4B depict an example of a PPE in an active and standby position, the PPE having optical patterns embodied thereon, according to techniques of this disclosure. More specifically, FIGS. 4A-4B depict a filtered air respirator system, which may also be referred to as a supplied air system generally. The system represents one example of PPE 13 shown in FIG. 2. The system includes a head top 403 having a helmet 400 and a visor 401. Head top 403 is connectable to a clean air supply source by a hose. Clean air supply source can be any type of air supply source, such as a blower assembly for a powered air purifying respirator (PAPR), an air tank for a self-contained breathing apparatus (SCBA) or any other device that provides air to head top 403.

Visor 401 is sized to fit over at least a user's nose and mouth. Visor 401 includes a lens which is rotatable attached to helmet 400 at a pivot point. A rotation position of visor 401 about the pivot point determines whether the visor 401 is open, partially open, or closed. A closed visor 401 provides eye and face protection for hazards as well as respiratory protection to a user (provided the air supply to head top 403 is satisfactory). A partially open visor 401 provides at least some eye and face protection for hazards as well as at least some amount of respiratory protection. This "partially open" visor state, if kept to short durations, can assist the user in face to face communications with other workers. An open visor 401 provides little or no protection.

Helmet 400 has an optical pattern 402 embodied thereon. Visor 401 has an optical pattern 404 embodied thereon. In some examples, each side of the visor 401 has an optical pattern embodied thereon, which may be the same optical pattern. In this way, at least one of these optical patterns may be visible to an image capture device in more orientations of the worker wearing the head top 403. Optical patterns 402, 404 may be printed on respective optical tags affixed to helmet 400 and visor 401, respectively.

FIG. 4A depicts visor 401 in a closed position that is the active position for the head top 403. When worn by a worker in a work environment, an image capture device 28 may obtain an image showing the head top 403 having visor 401 in the closed position. PPEMS 6 may obtain and process the image to determine a spatial relation between optical patterns 402, 404. More particularly, in this example of a PPE, PPEMS 6 may determine an orientation of optical pattern 402, an orientation of optical pattern 404, and a relative orientation between optical patterns 402, 404 that corresponds to a difference between the two orientations thereof. The relative orientation determined by PPEMS 6 indicates the head top 403 has visor 401 in a closed position. The closed position is the active position for head top 403 and may not correspond to a safety condition. However, PPEMS 6 may store event data having (1) the image, (2) a description of the head top 403 or full respirator system, (3) an identification of the worker, (4) a description of the spatial relation between optical patterns 402, 404, (5) a time of the image capture of the image, and/or (6) an indication that no safety condition was present, for instance.

FIG. 4B depicts visor 401 in an open position that is the standby position for head top 403. When worn by a worker in a work environment, visor 401 may be rotated about the pivot by the worker, and an image capture device 28 may contemporaneously obtain an image showing head top 403 having visor 401 in the open position. PPEMS 6 may obtain and process the image to determine a spatial relation between optical patterns 402, 404. More particularly, in this example of a PPE, PPEMS 6 may determine an orientation of optical pattern 402, an orientation of optical pattern 404, and a relative orientation between optical patterns 402, 404 that corresponds to a difference between the two orientations thereof. The relative orientation determined by PPEMS 6 indicates the head top 403 has visor 401 in an open position. The relative orientation is different than then relative orientation as in the closed position depicted in FIG. 4A. The open position is the standby position for head top 403 and may correspond to a safety condition for head top 403 operating in the work environment. PPEMS 6 may therefore perform an operation based at least in part on the safety condition. PPEMS 6 may also store event data having (1) the image, (2) a description of the head top 403 or full respirator system, (3) an identification of the worker, (4) a description of the spatial relation between optical patterns 402, 404, (5) a time of the image capture of the image, and/or (6) an indication that the safety condition occurred, for instance.

Figure 5A:
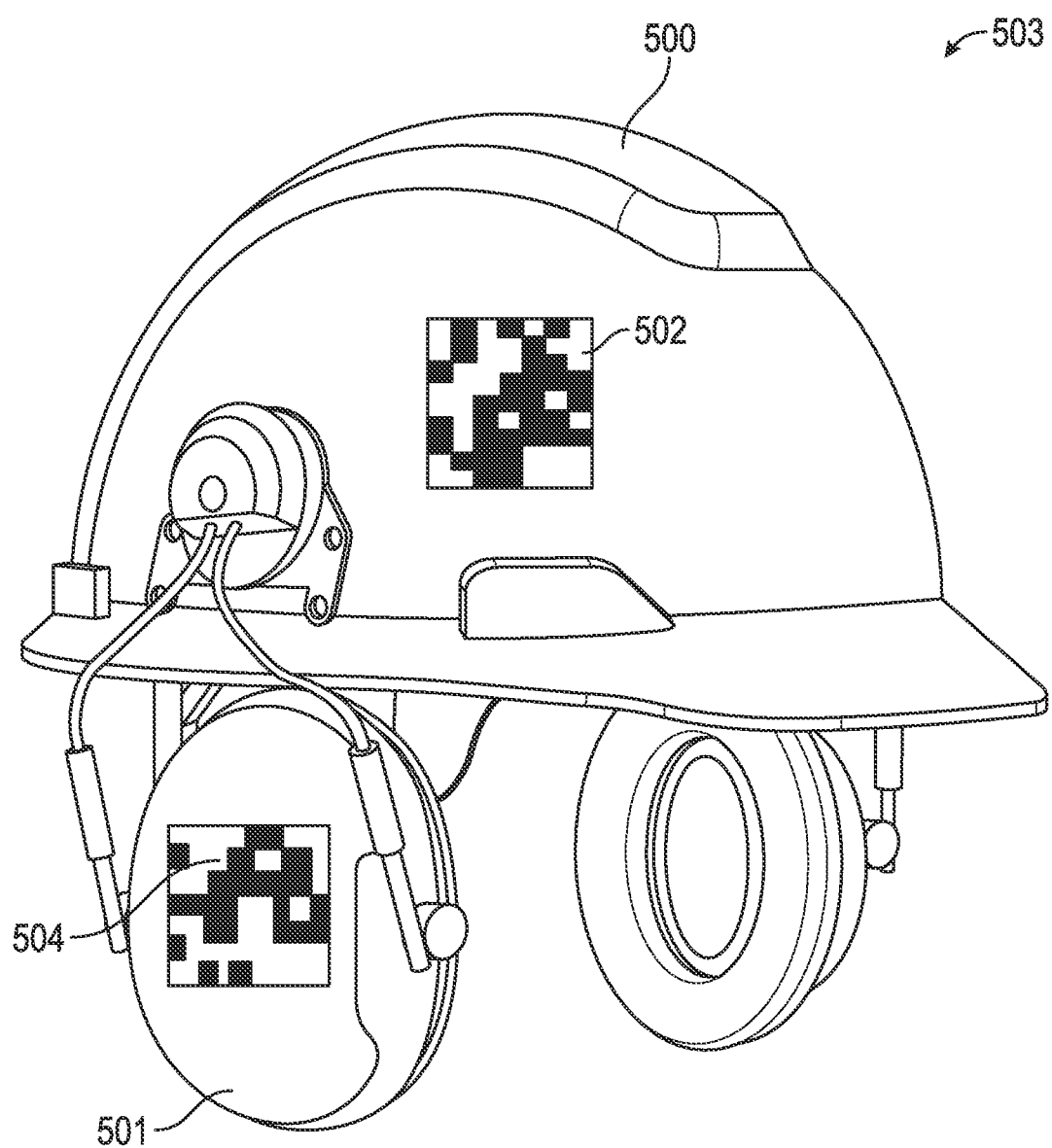
FIGS. 5A-5C depict an example of a PPE in active and standby positions, the PPE having optical patterns embodied thereon, according to techniques of this disclosure.
Figure 5B:
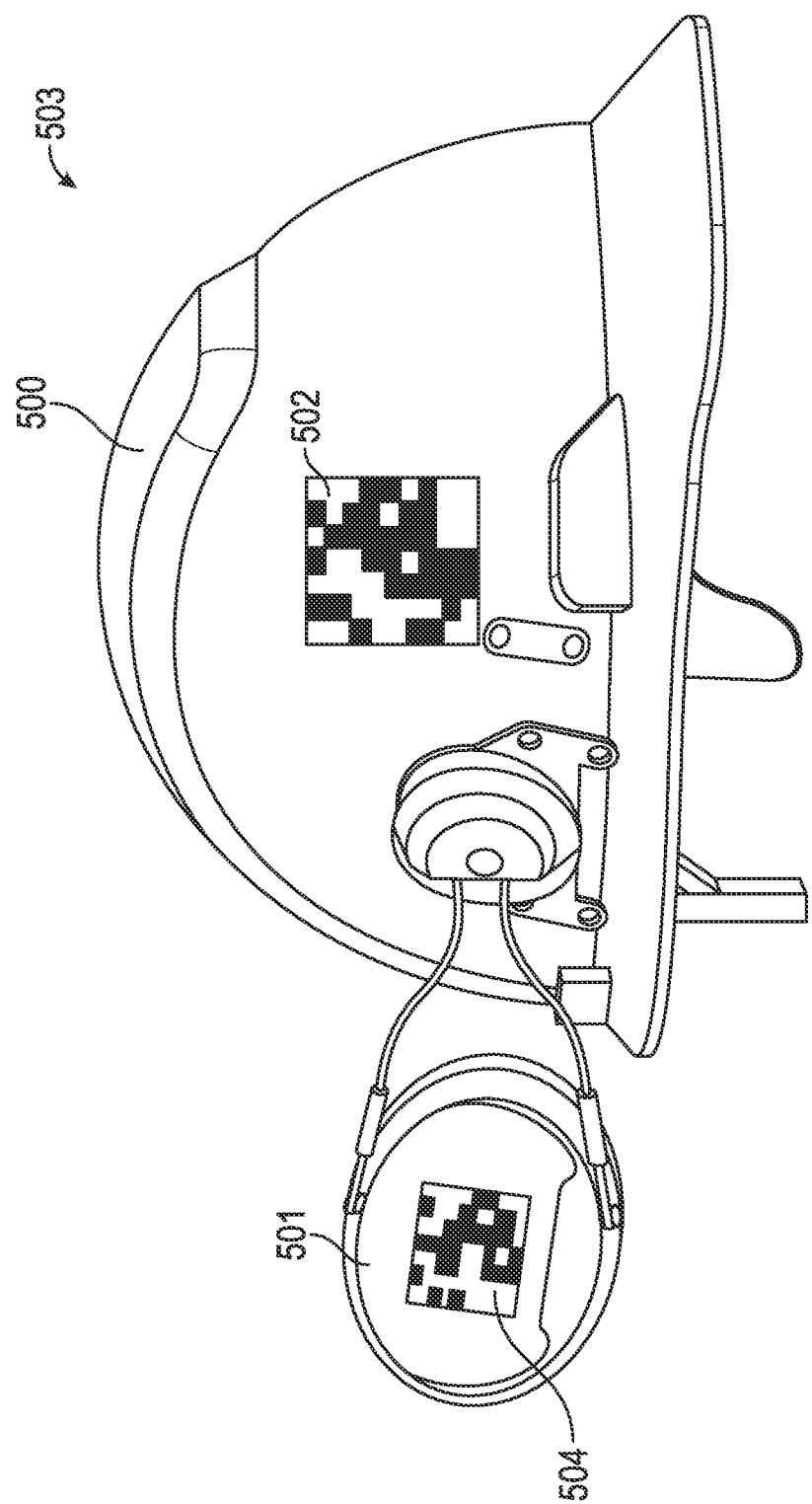
Figure 5C:
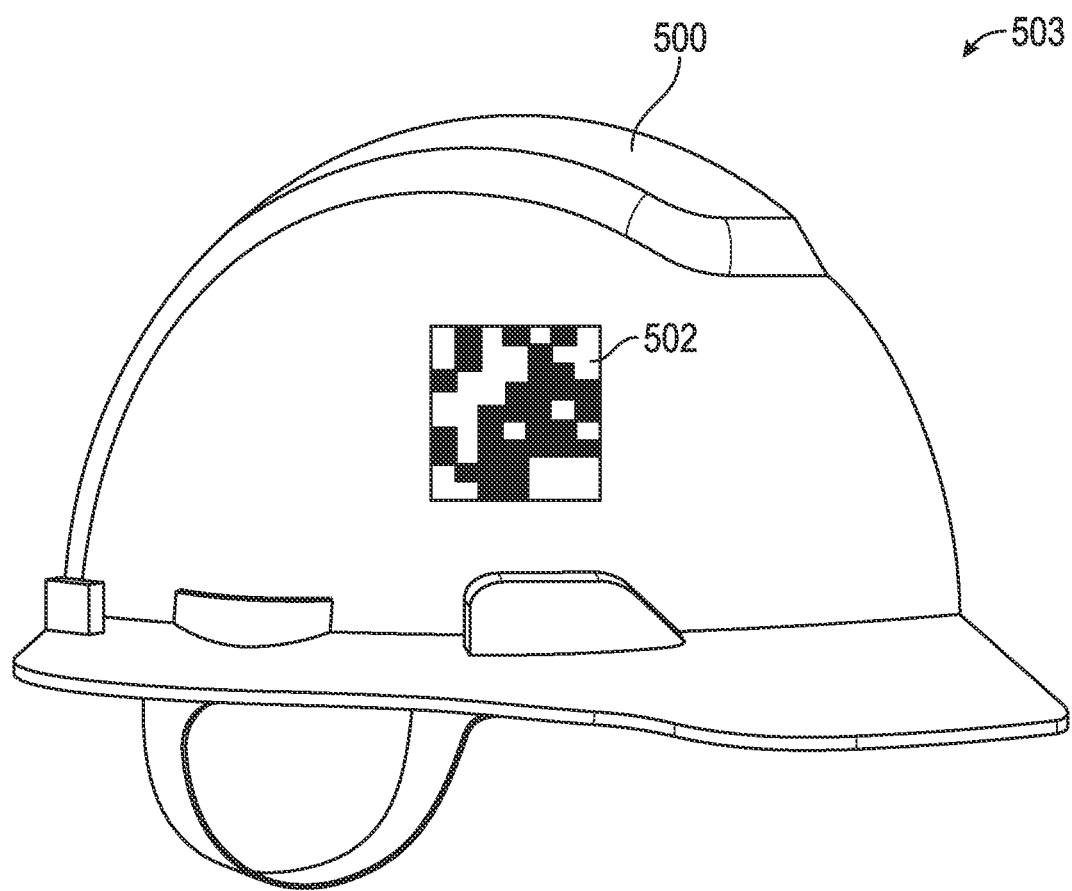

FIGS. 5A-5C depict an example of a PPE in active and standby positions, the PPE having optical patterns embodied thereon, according to techniques of this disclosure. More specifically, FIGS. 5A-5C depict a noise attenuation system, in accordance with techniques described herein. The noise attenuation system 503 represents one example of PPE 13 shown in FIG. 2. The noise attenuation system 503 includes a helmet 500 and ear muffs 501. Ear muffs 501 are sized to fit over a user's ears. Ear muffs 501 are rotatable attached to helmet 500 at a pivot point. A rotation position of ear muffs 501 about the pivot point determines whether the ear muffs 501 are in active or standby position. Ear muffs 501 in active position (i.e., positioned to enclose the ears) provide noise attenuation to the ears of a user. Ear muffs 501 in standby position do not provide noise attenuation to the ears of a user.

Helmet 500 has an optical pattern 502 embodied thereon. Ear muffs 501 have an optical pattern 504 embodied thereon. In some examples, each side of the ear muffs 501 have an optical pattern embodied thereon, which may be the same optical pattern. In this way, at least one of these optical patterns may be visible to an image capture device in more orientations of the worker wearing the system 503. Optical patterns 502, 504 may be printed on respective optical tags affixed to helmet 500 and ear muffs 501, respectively.

FIG. 5A depicts ear muffs 501 in the active position for system 503. When worn by a worker in a work environment, an image capture device 28 may obtain an image showing system 503 having ear muffs 501 in the active position. PPEMS 6 may obtain and process the image to determine a spatial relation between optical patterns 502, 504. More particularly, in this example of a PPE, PPEMS 6 may determine an orientation of optical pattern 502, an orientation of optical pattern 504, and a relative orientation between optical patterns 502, 504 that corresponds to a difference between the two orientations thereof. The relative orientation determined by PPEMS 6 indicates the system 503 has ear muffs 501 in an active position. The active position may not correspond to a safety condition. However, PPEMS 6 may store event data having (1) the image, (2) a description of the system 503, (3) an identification of the worker, (4) a description of the spatial relation between optical patterns 502, 504, (5) a time of the image capture of the image, and/or (6) an indication that no safety condition was present, for instance.

FIG. 5B depicts ear muffs 501 in an open position that is the standby position for system 503. When worn by a worker in a work environment, ear muffs 501 may be rotated about the pivot by the worker, and an image capture device 28 may contemporaneously obtain an image showing system 503 having ear muffs 501 in the standby position. PPEMS 6 may obtain and process the image to determine a spatial relation between optical patterns 502, 504. More particularly, in this example of a PPE, PPEMS 6 may determine an orientation of optical pattern 502, an orientation of optical pattern 504, and a relative orientation between optical patterns 502, 504 that corresponds to a difference between the two orientations thereof. The relative orientation determined by PPEMS 6 indicates the system 503 has ear muffs 501 in a standby position. The relative orientation is different than then relative orientation as in the active position depicted in FIG. 5A. The standby position may correspond to a safety condition for system 503 operating in the work environment. PPEMS 6 may therefore perform an operation based at least in part on the safety condition. PPEMS 6 may also store event data having (1) the image, (2) a description of the system 503, (3) an identification of the worker, (4) a description of the spatial relation between optical patterns 502, 504, (5) a time of the image capture of the image, and/or (6) an indication that the safety condition occurred, for instance.

FIG. 5C depicts helmet 500 without attached ear muffs 501. In this situation, only optical pattern 502 is embodied on a component of system 503. PPEMS 6 may obtain and process an image of system 503 to determine optical pattern 502 is present and optical pattern 504 is not present. Optical patterns 502, 504 are associated as a pair of optical patterns in PPEMS 6. Because optical pattern 504 is not present for system 503, ear muffs 501 are not present, which is a configuration that may correspond to a safety condition for system 503 operating in the work environment. PPEMS 6 may therefore perform an operation based at least in part on the safety condition. PPEMS 6 may also store event data having (1) the image, (2) a description of the system 503, (3) an identification of the worker, (4) a description of the absence of the expected optical pattern 504, (5) a time of the image capture of the image, and/or (6) an indication that the safety condition occurred, for instance.

In some examples of a noise attenuation system including a helmet and ear muffs, the ear muffs may include an "over-the-head" tension band for holding the ear muffs to the user's ears. The tension band may be positioned under the helmet, around the helmet, or in the back of the user's head. Nevertheless, in such cases, ear muffs 501 in the active position enclose the user's ears to provide noise attenuation, and PPEMS 6 may apply techniques described above to determine the spatial relation between optical patterns 502, 504 and identify whether a safety condition is present.

Figure 6A:
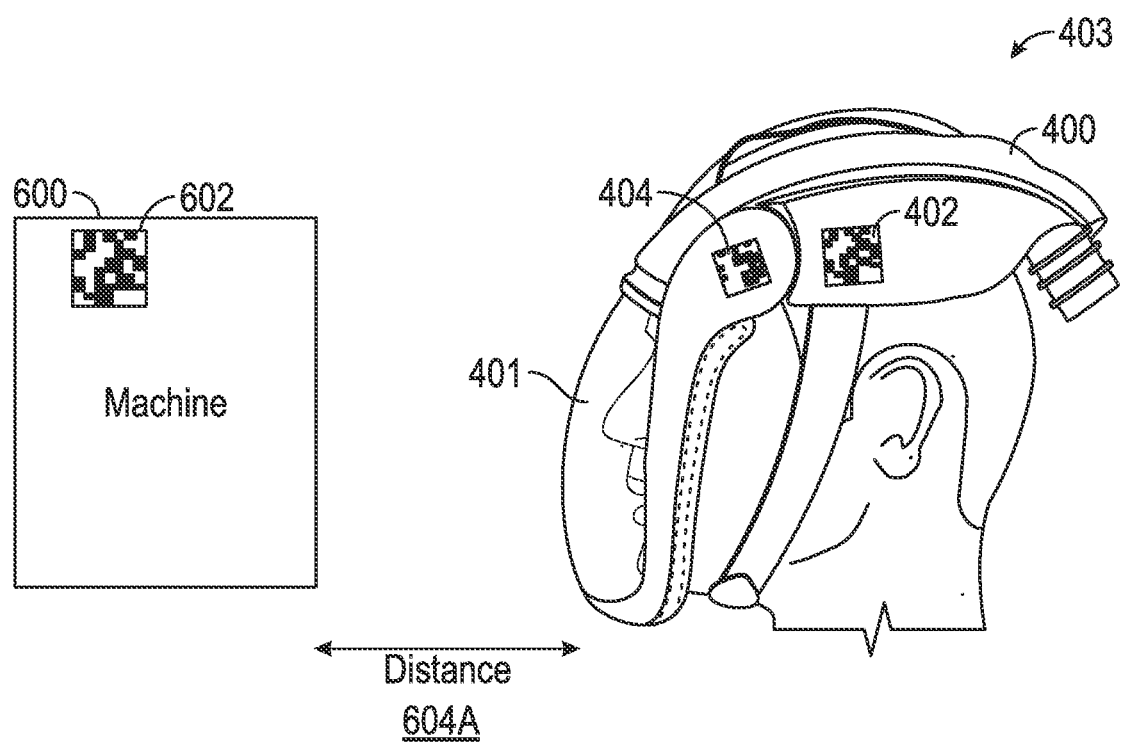
FIGS. 6A-6B depict an example of a PPE and a machine, each having an optical pattern embodied thereon, according to techniques of this disclosure.
Figure 6B:
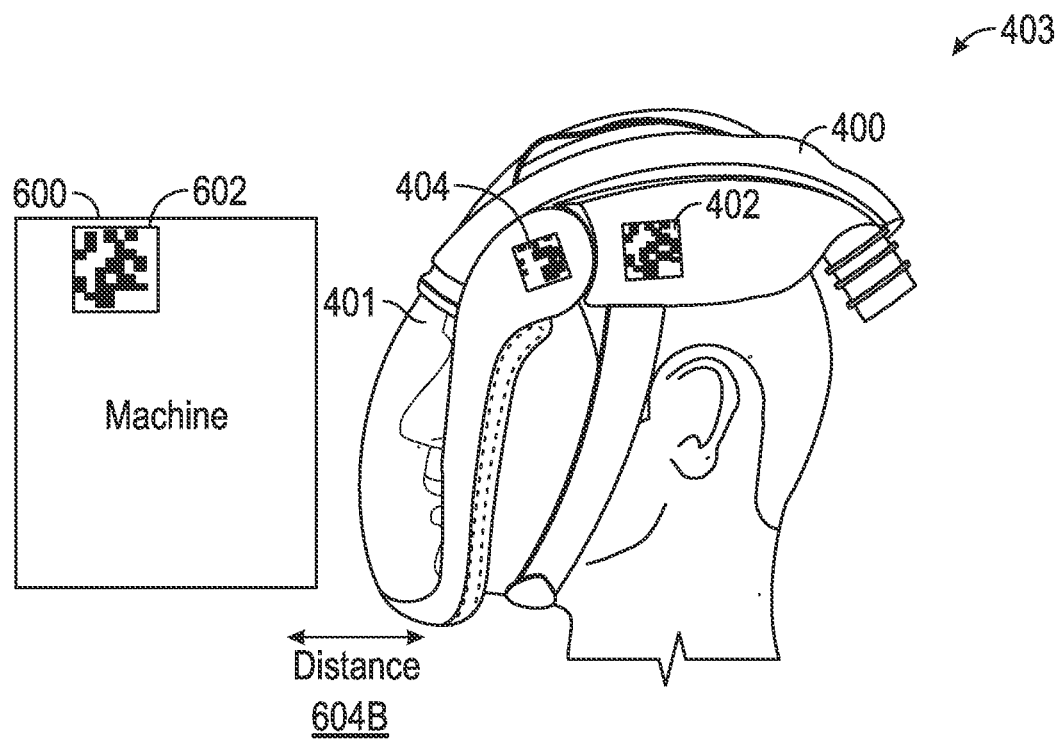

FIGS. 6A-6B depict an example of a PPE and a machine, each having an optical pattern embodied thereon, according to techniques of this disclosure. More specifically, FIGS. 6A-6B depict a worker wearing the filtered air respirator system of FIGS. 4A-4B, and a machine. The worker is wearing head-top 403 with visor 401 positioned in the closed position, which provides face, eye, and/or respiratory protection. Machine 600 may be located in a work environment and present one or more proximity hazards, such as those associated with force-induced trauma, lacerations, heat, noxious gases, falls, noise, and so forth. Machine 600 may be, to name just a few examples, a welding system, saw or other cutting tool, or jackhammer. Machine 600 may be an example of item 26 of FIG. 1.

FIG. 6A depicts the worker at a distance 604A from machine 600. FIG. 6B depicts the worker at a distance 604B from machine 600, where distance 604B is shorter than distance 604A.

Machine 600 has optical pattern 602 embodied thereon. PPEMS 6 may obtain and process an image that includes optical patterns 402, 602 as shown in FIG. 6A to determine a spatial relation between optical patterns 402, 602. More particularly, in this example of a PPE paired with a machine in PPEMS 6 by the pairing of optical patterns 402, 602, PPEMS 6 may determine a distance between optical patterns 402, 602 corresponding to distance 604A. The spatial relation determined by PPEMS 6 indicates that the user is not within a threshold distance for the proximity hazards associated with machine 600. This distance may not correspond to a safety condition. PPEMS 6 may further determine a spatial relation between optical patterns 402, 404, as described above with respect to FIGS. 4A-4B, to determine visor 401 is in an open position in some cases. PPEMS 6 may responsively store event data having (1) the image, (2) a description of the system 403 and machine 600, (3) an identification of the worker, (4) a description of the spatial relation between optical patterns 402, 602 (5) a description of the spatial relation between optical patterns 402, 404 (6) a time of the image capture of the image, and/or (7) an indication that no safety condition was present, for instance.

PPEMS 6 may, at a subsequent time in which the worker has moved to a distance 604B to machine 600, obtain and process an image that includes optical patterns 402, 602 as shown in FIG. 6B to determine a spatial relation between optical patterns 402, 602. More particularly, in this example of a PPE paired with a machine in PPEMS 6 by the pairing of optical patterns 402, 602, PPEMS 6 may determine a distance between optical patterns 402, 602 corresponding to distance 604B. The spatial relation determined by PPEMS 6 indicates that the user is within a threshold distance for the proximity hazards associated with machine 600. This distance may correspond to a safety condition. PPEMS 6 may further determine a spatial relation between optical patterns 402, 404, as described above with respect to FIGS. 4A-4B, to determine visor 401 is in an open position. PPEMS 6 may determine that the open position of visor 401 in combination with the worker being within the threshold distance for the proximity hazards being associated with machine 600, as indicated by the spatial relation between optical patterns 402, 602, corresponds to a safety condition. PPEMS 6 may therefore perform an operation based at least in part on the safety condition. PPEMS 6 may also store event data having (1) the image, (2) a description of the system 403 and machine 600, (3) an identification of the worker, (4) a description of the spatial relation between optical patterns 402, 602 (5) a description of the spatial relation between optical patterns 402, 404 (6) a time of the image capture of the image, and/or (7) an indication that no safety condition was present, for instance.

Figure 7:
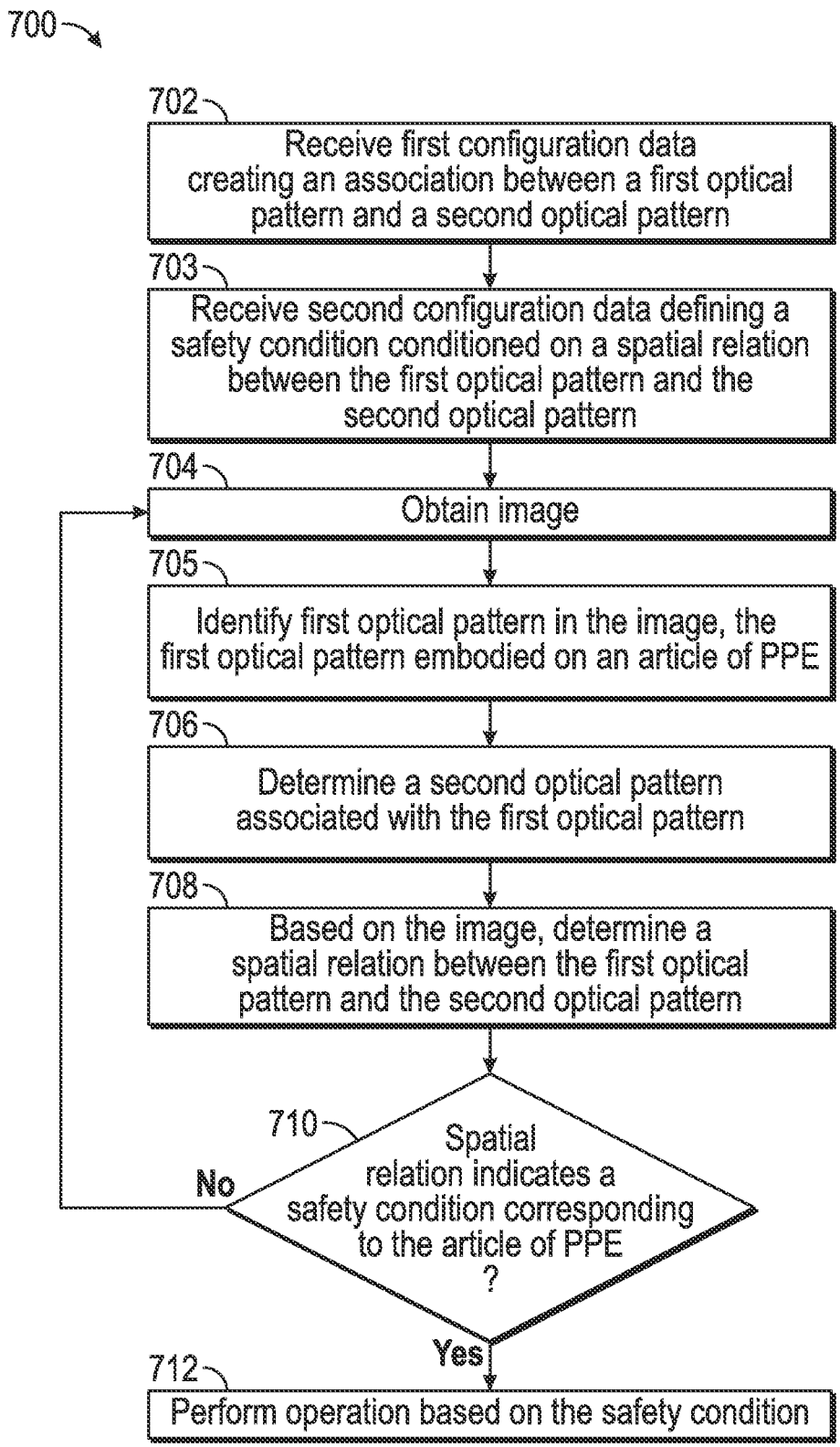
FIG. 7 is a flowchart illustrating an example mode of operation for a personal protective equipment management system, according to techniques described in this disclosure.

FIG. 7 is a flowchart illustrating an example mode of operation for a personal protective equipment management system, according to techniques described in this disclosure. Mode of operation 700 is described with respect to PPEMS 6 in the context of FIG. 1 but may be performed by any PPEMS described herein or other suitable components.

PPEMS 6 receives first configuration data that creates an association between a first optical pattern 22A and a second optical pattern 23A (702). The association may be between respective optical pattern codes for the first optical pattern 22A and the second optical pattern 23A. PPEMS 6 receives second configuration data that defines a safety condition that is conditioned on a spatial relation between the first optical pattern 22A and the second optical pattern 23A (703). For example, the second configuration data may specify that the safety condition is present if the spatial relation is within a threshold.

PPEMS 6 subsequently obtains an image of a work environment, captured by image capture device 28 (740). PPEMS 6 processes the image to identify first optical pattern 22A in the image, the first optical pattern 22A being embodied on an article of PPE 13A (705). PPEMS 6 determines, based at least on the first configuration data, that second optical pattern 23A is associated with the first optical pattern 22A (706). Based at least on the association and on the image, and the images of the first optical pattern 22A and the second optical pattern 23A identified therein, PPEMS 6 determines a spatial relation between the first optical pattern 22A and the second optical pattern 23A (708). Operations 708 may be performed before operation 706.

If the spatial relation satisfies a condition of the safety condition specified in the second configuration data (YES branch of 710), the safety condition is present and PPEMS 6 performs an operation based on the safety condition (712). If the spatial relation does not satisfy a condition of the safety condition specified in the second configuration data (NO branch of 710), the PPEMS 6 may take no ameliorative action.

Optical patterns 22 can be formed using printing or patterning. For example, the optical patterns 22 may be formed using inkjet printing, screen printing, flexographic printing, and the like onto a substrate. Optical patterns 22 may be die cut onto a substrate, or it can be etched onto a substrate. Optical patterns 22 may be embedded on the PPE by direct directly printing or etching the PPE surface, or optical patterns 22 may be applied to the PPE in the form of a label. The label can be affixed on the PPE by adhesive or by means of mechanical fasteners for example.

The substrate can be any printable or patternable material such as paper, plastic film, tape or retroreflective material. A retroreflective substrate may be beaded such as 3M engineer grade retroreflective sheeting series 3200, 3M™ Scotchlite™ High Visibility Reflective tape series 8910, or it can be prismatic such as 3M™ High Intensity Prismatic Reflective Sheeting Series 3930, and 3M™ High Definition Reflective License Plate Sheeting Series 6700. For descriptive purposes only, the 3M™ High Definition Reflective License Plate Sheeting will be used in subsequent examples to describe tags according to techniques herein.

Figure 8A:
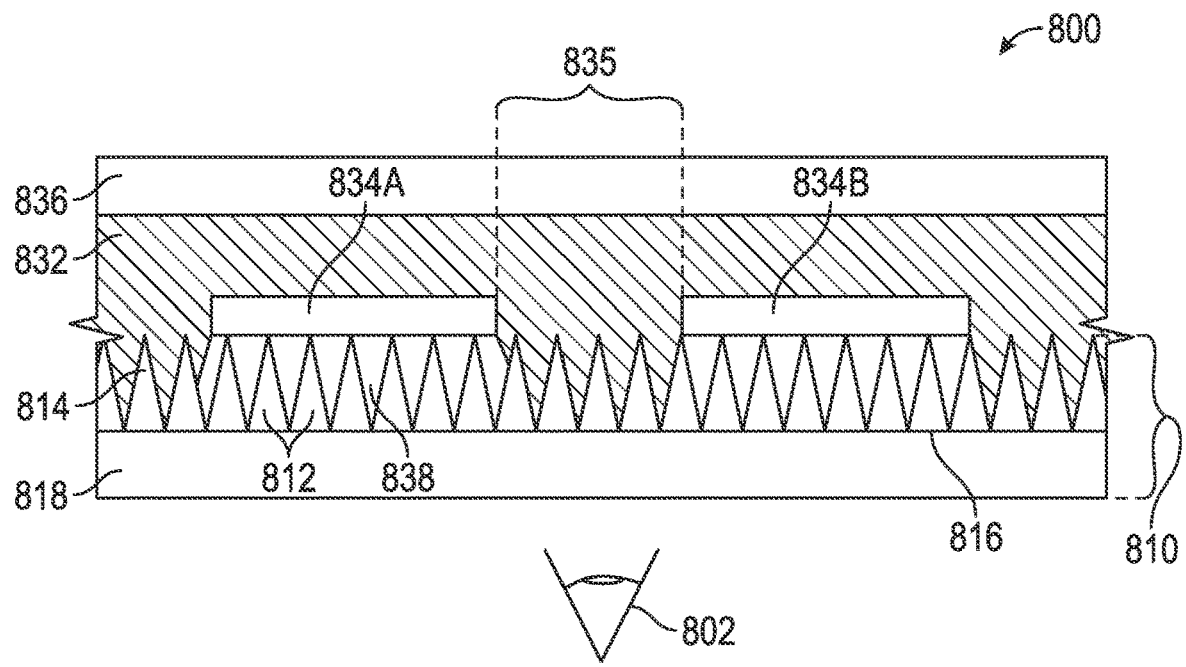
FIGS. 8A and 8B illustrate cross-sectional views of portions of an optical pattern formed on a retroreflective sheet, in accordance with techniques of this disclosure.
Figure 8B:
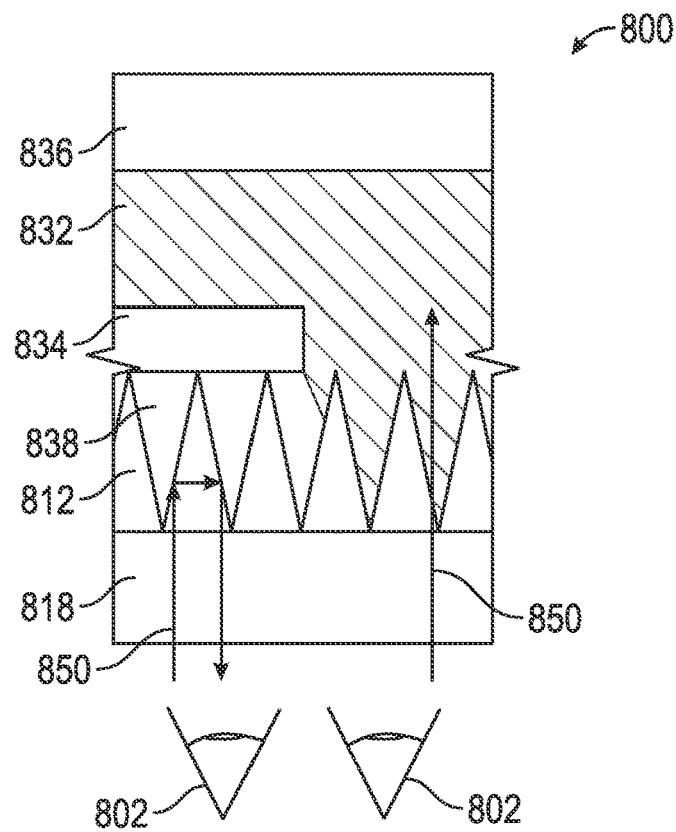

FIGS. 8A-8B illustrate cross-sectional views of portions of an optical pattern formed on a retroreflective sheet, in accordance with one or more techniques of this disclosure. Retroreflective article 800 includes a retroreflective layer 810 including multiple cube corner elements 812 that collectively form a structured surface 814 opposite a major surface 816. The optical elements can be full cubes, truncated cubes, or preferred geometry (PG) cubes as described in, for example, U.S. Pat. No. 7,422,334, incorporated herein by reference in its entirety. The specific retroreflective layer 810 shown in FIGS. 8A-8B includes a body layer 818, but those of skill will appreciate that some examples do not include an overlay layer. One or more barrier layers 834 are positioned between retroreflective layer 810 and conforming layer 832, creating a low refractive index area 838. Barrier layers 834 form a physical "barrier" between cube corner elements 812 and conforming layer 832. Barrier layer 834 can directly contact or be spaced apart from or can push slightly into the tips of cube corner elements 812. Barrier layers 834 have a characteristic that varies from a characteristic in one of (1) the areas 832 not including barrier layers (view line of light ray 850) or (2) another barrier layer 834. Exemplary characteristics include, for example, color and infrared absorbency.

In general, any material that prevents the conforming layer material from contacting cube corner elements 812 or flowing or creeping into low refractive index area 838 can be used to form the barrier layer Exemplary materials for use in barrier layer 834 include resins, polymeric materials, dyes, inks (including color-shifting inks), vinyl, inorganic materials, UV-curable polymers, multi-layer optical films (including, for example, color-shifting multi-layer optical films), pigments, particles, and beads. The size and spacing of the one or more barrier layers can be varied. In some examples, the barrier layers may form a pattern on the retroreflective sheet. In some examples, one may wish to reduce the visibility of the pattern on the sheeting. In general, any desired pattern can be generated by combinations of the described techniques, including, for example, indicia such as letters, words, alphanumerics, symbols, graphics, logos, or pictures. The patterns can also be continuous, discontinuous, monotonic, dotted, serpentine, any smoothly varying function, stripes, varying in the machine direction, the transverse direction, or both; the pattern can form an image, logo, or text, and the pattern can include patterned coatings and/or perforations. The pattern can include, for example, an irregular pattern, a regular pattern, a grid, words, graphics, images lines, and intersecting zones that form cells.

The low refractive index area 838 is positioned between (1) one or both of barrier layer 834 and conforming layer 832 and (2) cube corner elements 812. The low refractive index area 838 facilitates total internal reflection such that light that is incident on cube corner elements 812 adjacent to a low refractive index area 838 is retroreflected. As is shown in FIG. 8B, a light ray 850 incident on a cube corner element 812 that is adjacent to low refractive index layer 838 is retroreflected back to viewer 802. For this reason, an area of retroreflective article 800 that includes low refractive index layer 838 can be referred to as an optically active area. In contrast, an area of retroreflective article 800 that does not include low refractive index layer 838 can be referred to as an optically inactive area because it does not substantially retroreflect incident light. As used herein, the term "optically inactive area" refers to an area that is at least 50% less optically active (e.g., retroreflective) than an optically active area. In some examples, the optically inactive area is at least 40% less optically active, or at least 30% less optically active, or at least 20% less optically active, or at least 10% less optically active, or at least at least 5% less optically active than an optically active area.

Low refractive index layer 838 includes a material that has a refractive index that is less than about 1.30, less than about 1.25, less than about 1.2, less than about 1.15, less than about 1.10, or less than about 1.05. In general, any material that prevents the conforming layer material from contacting cube corner elements 812 or flowing or creeping into low refractive index area 838 can be used as the low refractive index material. In some examples, barrier layer 834 has sufficient structural integrity to prevent conforming layer 832 from flowing into a low refractive index area 838. In such examples, low refractive index area may include, for example, a gas (e.g., air, nitrogen, argon, and the like). In other examples, low refractive index area includes a solid or liquid substance that can flow into or be pressed into or onto cube corner elements 812. Example materials include, for example, ultra-low index coatings (those described in PCT Patent Application No. PCT/US2010/031290), and gels.

The portions of conforming layer 832 that are adjacent to or in contact with cube corner elements 812 form non-optically active (e.g., non-retroreflective) areas or cells. In some examples, conforming layer 832 is optically opaque. In some examples conforming layer 832 has a white color.

In some examples, conforming layer 832 is an adhesive. Example adhesives include those described in PCT Patent Application No. PCT/US2010/031290. Where the conforming layer is an adhesive, the conforming layer may assist in holding the entire retroreflective construction together and/or the viscoelastic nature of barrier layers 834 may prevent wetting of cube tips or surfaces either initially during fabrication of the retroreflective article or over time.

In some examples, conforming layer 832 is a pressure sensitive adhesive. The PSTC (pressure sensitive tape council) definition of a pressure sensitive adhesive is an adhesive that is permanently tacky at room temperature which adheres to a variety of surfaces with light pressure (finger pressure) with no phase change (liquid to solid). While most adhesives (e.g., hot melt adhesives) require both heat and pressure to conform, pressure sensitive adhesives typically only require pressure to conform. Exemplary pressure sensitive adhesives include those described in U.S. Pat. No. 6,677,030. Barrier layers 834 may also prevent the pressure sensitive adhesive from wetting out the cube corner sheeting. In other examples, conforming layer 832 is a hot-melt adhesive.

In some examples, a pathway article may use a non-permanent adhesive to attach the article message to the base surface. This may allow the base surface to be re-used for a different article message. Non-permanent adhesive may have advantages in areas such as roadway construction zones where the vehicle pathway may change frequently.

In the example of FIG. 8A, a non-barrier region 835 does not include a barrier layer, such as barrier layer 834. As such, light may reflect with a lower intensity than barrier layers 834A-834B. Different patterns of non-barrier regions 835 and barrier layers 834A-834B on different instances of retroreflective article 800 may define the optical patterns described and used herein.

Additional example implementations of a retroreflective article for embodying an optical pattern are described in U.S. patent application Ser. No. 14/388,082, filed Mar. 29, 2013, which is incorporated by reference herein in its entirety. Additional description is found in U.S. Provisional Appl. Nos. 62/400,865, filed Sep. 28, 2016; 62/485,449, filed Apr. 14, 2017; 62/400,874, filed Sep. 28, 2016; 62/485, 426, filed Apr. 14, 2017; 62/400,879, filed Sep. 28, 2016; 62/485,471, filed Apr. 14, 2017; and 62/461,177, filed Feb. 20, 2017; each of which is incorporated herein by reference in its entirety.

FIG. 9 is a data structure, usable by a PPEMS, for identifying a safety condition in accordance with techniques described herein. Table 900 may represent an example instance of optical pattern code to PPE mapping structure 330. Entries of table 900 map a pair of optical pattern codes to a PPE pairing, where the PPE pairing may be a pairing of two components of an article of PPE, two articles of PPE, an article of PPE and an item in a work environment. In the illustrated example, optical pattern codes are shown as 5-digit numbers, but other examples of optical pattern codes may be used. The optical pattern codes may be examples of identifiers corresponding to machine-readable codes for optical patterns, as described above.

PPEMS 6 may determine a pair of optical patterns present in an obtained image and determine the respective optical pattern codes for the pair. PPEMS 6 may then query table 900 to determine the equipment pairing associated with the pair of optical patterns. For example, optical pattern code pair 00001, 00002 are for a pair of optical patterns embodied on a helmet and a visor, respectively, such as helmet 400 and visor 401 of FIGS. 4A-4B.

In some examples, a pair of optical patterns are the same optical pattern having a same optical pattern code (or "identifier"). In such cases, the optical pattern code pair may instead be a single optical pattern code for the pair of same optical patterns.

FIG. 10 is a data structure, usable by a PPEMS, for identifying a safety condition in accordance with techniques described herein. Table 1000 may represent an example instance of PPE safety conditions 332. Each entry of table 1000 maps an equipment pairing to a safety condition and an operation to be performed if the safety condition is satisfied/present. The safety condition is based on a spatial relation between a pair of optical patterns.

PPEMS 6 may use table 1000 in conjunction with table 900 to determine whether a safety condition is present and, if so, to perform an operation. For example, PPEMS 6 may determine a pair of optical patterns present in an obtained image and determine the respective optical pattern codes for the pair. PPEMS 6 may then query table 900 to determine the equipment pairing associated with the pair of optical patterns. For example, optical pattern code pair 00001, 00002 are for a pair of optical patterns embodied on a helmet and a visor, respectively.

PPEMS 6 may query table 1000 for the equipment pairing of the helmet and visor to obtain the safety condition, which in this example is "orientation difference>5 degrees". PPEMS 6 may determine the spatial relation and more specifically the relative orientation between the pair of optical patterns having optical pattern codes 00001, 00002 and present in an obtained image. If the relative orientation is greater than 5 degrees, PPEMS 6 may perform the specified operation, in this case, to notify the worker.

Tables 900 and 1000 may be combined in some cases such that each pair of optical pattern codes has a corresponding safety condition and operation, rather than by relation to an equipment pairing. Each pair of optical pattern codes may be trained into a combined table as a configuration step for a PPE that includes the pair of optical pattern codes. For example, an operator may place a pair of optical tags on the visor and helmet of a PPE, for instance. PPEMS 6 may obtain an image of the pair of optical tags as part of the configuration, with the PPE in active position. The operator may provide user input indicating the type of PPE. PPEMS 6 may determine a base relative orientation of the pair of optical tags of the PPE, then use the base relative orientation as a basis for subsequently determining the position or operational status of the PPE. In the above example, pivoting the visor up by 90 degrees to an open/standby position modifies the relative orientation of the pair of optical patterns of the optical tags by substantially 90 degrees. Accordingly, a safety condition that is conditioned on the relative orientation between the pair of optical patterns may be configured to account for the base relative orientation.

FIG. 11 is an example of an encoding usable for an optical pattern for embodiment on a PPE, according to techniques of this disclosure. Code 1100 is a visual representation of an optical pattern code. Code 1100 in this example is 7 modules (width) by 9 modules (height) but in other examples may be expanded or reduced in dimension. Each module or "cell" 1107 is colored either white or black (infrared reflecting or absorbing, respectively). A pre-defined set of modules 1107 (labelled as "white location finder" and "black location finder") are always either white or black according to a pre-defined pattern, which allows the image processing software of PPEMS 6 to locate and identify that an optical pattern code is present in an image generated by an image capture device. In FIG. 11, white location finders are located at the corners and "top" of code 1100 and the black location finders are located at the "top" of code 1100. In addition, the set 1106 of modules 1107 that make up the white and block location finders allow the image processing software to determine an orientation of the code 1100 with respect to the coordinate system of the image. In FIG. 11, the "top" of code 1100 is labeled "TOP" and the bottom is labeled "BOTTOM" to denote that code 1100 has an orientation.

The remaining 48 cells are divided into 24 data cells 1102 that gives unique representations based on the black/white assignments for each cell as well as 24 correction code cells 1104 that allows the code to be recovered even if the code is partially blocked or incorrectly read. In this specific design, there are 2^24 unique representations (~16 million), but based on the resolution needed, the code can be expanded to include more data cells 1102 and fewer correction code cells 1104 (for example, if 12 of the correction code cells 1104 become data cells 1102, there would be 2^36 or ~64 billion unique representations).

In some cases, the code operates as a more generalized version of the code where a full rectangular retroreflective substrate is available and the correction code is left fully intact for recovery and verification. The location finder uses all corners of the code and an alternating white/black pattern along the top edge allows for a single system to differentiate and decode multiple code sizes.

In some examples, code 1100 is printed onto 3M High Definition License Plate Sheeting Series 6700 with a black ink using an ultraviolet (UV) inkjet printer, such as MIMAKU UJF-3042HG or 3M™ Precision Plate System to produce an optical tag. The ink may contain carbon black as the pigment and be infrared absorptive (i.e., appears black when viewed by an infrared camera). The sheeting includes a pressure-sensitive adhesive layer that allows the printed tag to be laminated onto articles of PPE. In some examples, the code 1100 is visible to the user. In some examples, an additional layer of mirror film can be laminated over the sheeting with the printed code 1100, thereby hiding the printed code 1100 from the naked eye. As the mirror film is transparent to infrared light, an infrared camera can still detect the code 1100 behind the mirror film, which may also improve image processing precision. The mirror film can also be printed with an ink that is infrared transparent without interfering with the ability for an infrared camera to detect the code 1100.

In some examples, an optical tag may be generated to include one or more layers that avoid the high reflectivity of a mirror film but be infrared transparent such that the machine-readable code is not visible in ambient light but readily detectable within images obtained by an infrared camera. This construction may be less distracting to workers or other users.

Such an optical tag can be generated with a white mirror film, such as those disclosed in PCT/US2017/014031, on top of a retroreflective material. The radiometric properties of the retroreflective light of an optical tag can be measured with an Ocean Optics Spectrometer (model number FLAME-S-VIS-NIR), light source (model HL-2000-FHSA), and reflectance probe (model QR400-7-VIS-BX)

over a geometry of 0.2 degree observation angle and 0 degree entrance angle, as shown by percent of reflectivity (R %) over a wavelength range of 400-1000 nanometers.

Optical tags may be manufactured in pairs such that a first optical tag includes a first optical pattern and a second optical tag includes a second optical pattern. The first and second optical patterns may be associated inherently by indicating the same code/identifier, or explicitly by configuring PPEMS 6 to include an association of the first optical pattern and the second optical pattern. A pair of optical tags with associated, respective optical patterns may be packaged and sold for placement upon different components of single PPE or upon different PPEs for which the spatial relation between the PPEs may indicate a safety condition.

Figure 12:
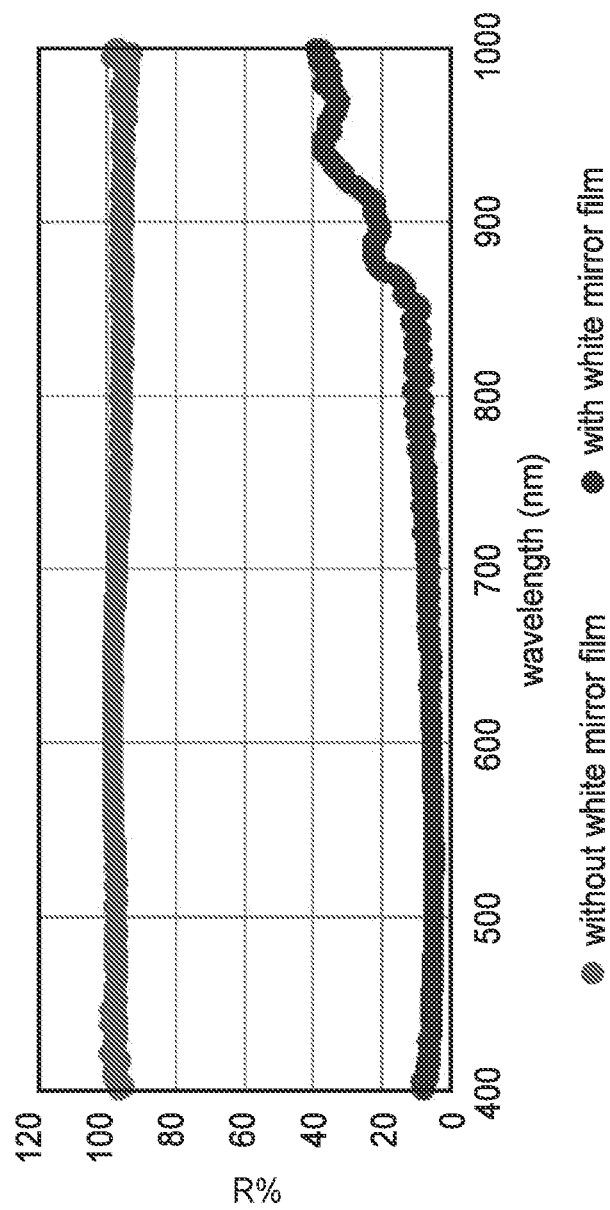
FIG. 12 is a graph illustrating properties of example optical tags, according to techniques of this disclosure.

FIG. 12 illustrates a retroreflective spectrum of a 3M™ High Definition License Plate Sheeting Series 6700 laminated with 3M™ Digital License Plate Clear Protective Film Series 9097, in the presence or the absence of the white mirror film. The white mirror film blocks almost all retroreflective light in the visible wavelength range (i.e., 400 nanometer to 700 nanometer), while permitting sufficient infrared (IR) light (including 950 nanometer) through to be captured by an IR camera.

Figure 13A:
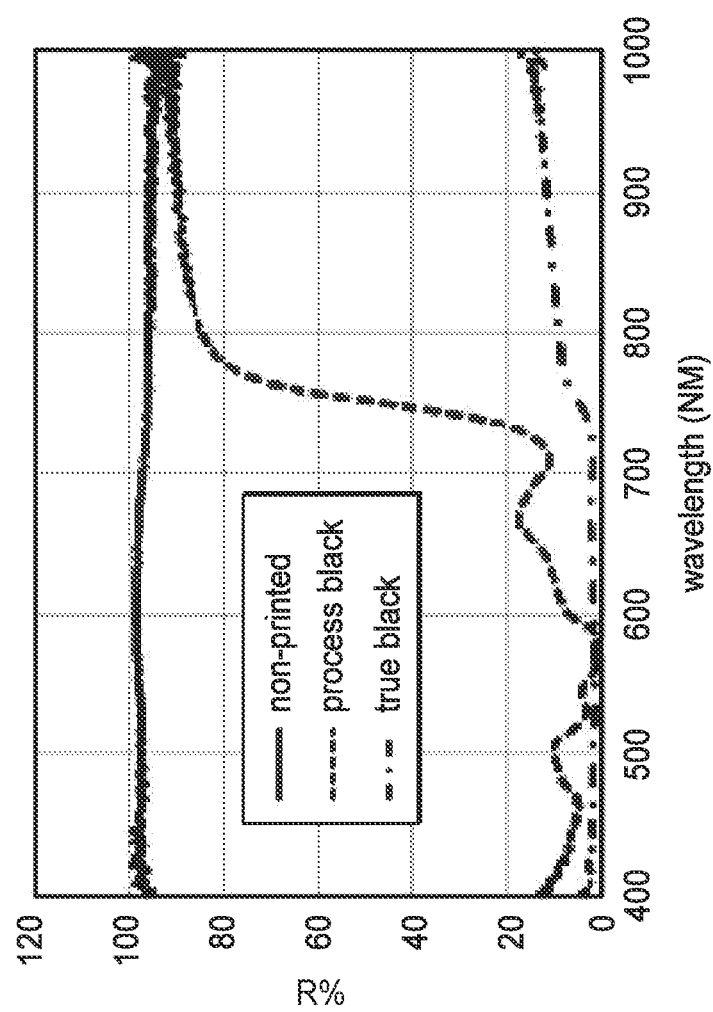
FIGS. 13A-13B are graphs illustrating properties of example optical tags, according to techniques of this disclosure.
Figure 13B:
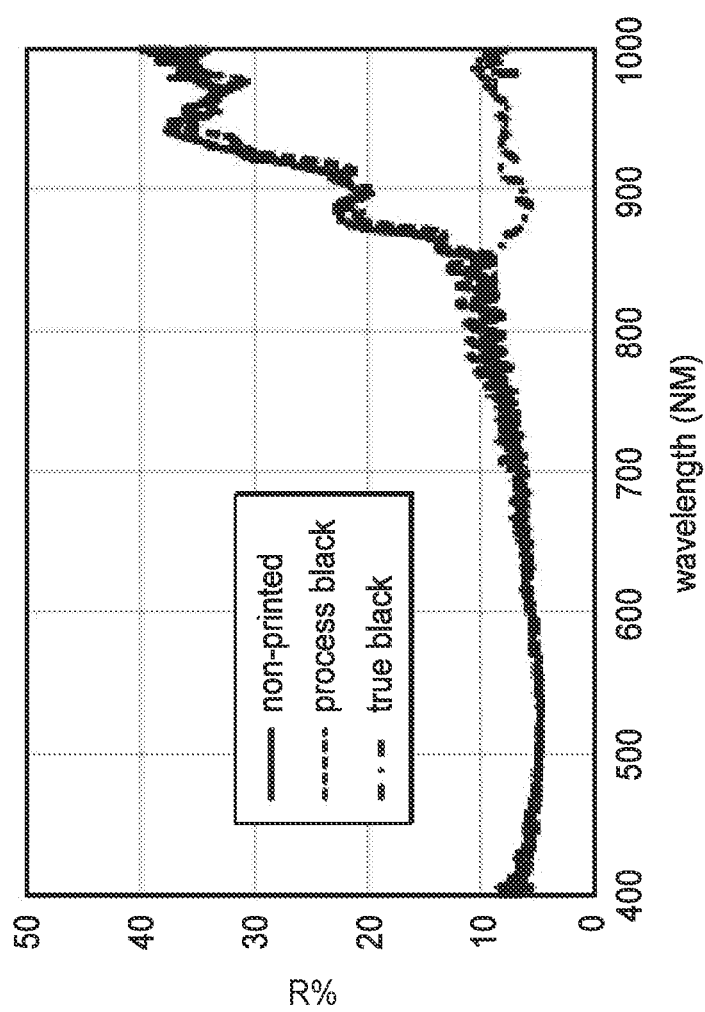

FIGS. 13A-13B depicts optical properties of the example optical tags, according to techniques of this disclosure. For these example optical tags, a 40 millimeter by 40-millimeter square pattern was printed on 3M™ High Definition License Plate Sheeting Series 6700 by 3M™ Precision Plate System, using 3M™ UV Curable Inkjet Ink Series 1500 with black, cyan, magenta, and yellow ink level as indicated. The square pattern can be non-printed, i.e., no black, cyan, magenta, or yellow; printed with "processed" black, i.e., no black, full cyan, magenta, and yellow; or printed with "true" black, i.e., full black, cyan, magenta, and yellow. The printed samples were laminated with 3M™ Digital License Plate Clear Protective Film Series 9097. The white mirror film was optionally placed on top of the laminate to form the example optical tags. The retroreflective spectrum of the example optical tags on the printed area was measured by an Ocean Optics Spectrometer (model number FLAME-S-VIS-NIR), light source (model HL-2000-FHSA), and reflectance probe (model QR400-7-VIS-BX) over a geometry of 0.2 degree observation angle and 0 degree entrance angle, as shown by percent of reflectivity (R %) over a wavelength range of 400 nanometer to 1000 nanometer.

FIG. 13A shows the retroreflective spectra of the example optical tags in the absence of the white mirror film, and FIG. 13B is the retroreflective spectra of the example optical tags in the presence of the white mirror film.

FIG. 14 depicts the contrast ratio of indicated example optical tags based on the R % at 950 nanometer wavelength, calculated as the ratio of the difference between the printed area and the non-printed area against the non-printed area. Because the cyan, magenta, and yellow inks have high transmission in near-IR region, while the black ink has low transmission in near IR region, the "true" black square has a much higher contrast ratio at near-IR wavelength 950 nanometer over the non-printed area, compared with the contrast ratio of the "processed" black square over the non-printed area. While the black squares on the example optical tags in the absence of the white mirror film are visible to naked eyes, the black squares on the example optical tags in the presence of the white mirror film are hidden from observers and thus potentially less distracting to workers. At the same time, the contrast ratio between printed area and the non-printed area are the same in the absence and in the presence of the white mirror film, thus enabling similar near-IR readability.

It will be appreciated that numerous and varied other arrangements may be readily devised by those skilled in the art without departing from the spirit and scope of the invention as claimed. For example, each of the communication modules in the various devices described throughout may be enabled to communicate as part of a larger network or with other devices to allow for a more intelligent infrastructure. Information gathered by various sensors may be combined with information from other sources, such as information captured through a video feed of a work space or an equipment maintenance space. In some instances, a portal configuration may be used such that if any of the systems described herein detect that a user or worker has exceeded a given threshold (whether high or low), the worker is prevented from physically gaining access to a particular work space or other area. Information gathered by the systems described herein can be used for further data analytics to determine compliance with various rules or regulations, and to improve safety processes. In some instances, a geo-location device, such as a global positioning system (GPS) may be incorporated into any of the systems described herein to provide user location. In some instances, the information collected by the systems and sensors described herein may be used to determine remaining service life of any PPE.

It will be appreciated that based on the above description, aspects of the disclosure include methods and systems for determining time of use (wear time) of articles, such as PPE articles, by determining if they satisfy at least one criterion.

Although the methods and systems of the present disclosure have been described with reference to specific exemplary embodiments, those of ordinary skill in the art will readily appreciate that changes and modifications may be made thereto without departing from the spirit and scope of the present disclosure.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath,"

"below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

What is claimed is:

1. A method comprising:
   receiving, by a computing device from at least one image capture device, an image that includes a first optical pattern embodied on a surface of an article of personal protective equipment (PPE) and also includes a second optical pattern;
   determining, by the computing device based at least in part on the first optical pattern and the second optical pattern, a spatial relation between the first optical pattern and the second optical pattern;
   identifying, by the computing device based at least in part on the spatial relation between the first optical pattern and the second optical pattern, a safety condition that corresponds at least in part to the article of PPE; and
   performing, by the computing device, at least one operation based at least in part on the safety condition.

2. The method of claim 1, wherein the article of PPE includes a first optical tag attached to the article of PPE, wherein the first optical tag includes the first optical pattern.

3. The method of claim 1, wherein determining the spatial relation between the first optical pattern and the second optical pattern comprises determining, by the computing device, a relative orientation between the first optical pattern and the second optical pattern.

4. The method of claim 1, wherein the relative orientation is a first relative orientation, the method further comprising:
   determining, by the computing device, a second relative orientation of the first optical pattern in relation to the second optical pattern that is required for at least one of a hazard, work environment, or work activity; and
   determining, by the computing device, that the first relative orientation is different from the second relative orientation,
   wherein identifying the safety condition comprises determining the safety condition based at least in part on the second relative orientation not being satisfied by the first relative orientation.

5. The method of claim 1, wherein the second optical pattern is not embodied on the article of PPE and is not embodied on a worker wearing the article of PPE.

6. The method of claim 1, wherein the second optical pattern is embodied on at least one of the article of PPE or a worker wearing the article of PPE.

7. The method of claim 1, wherein determining the spatial relation between the first optical pattern and the second optical pattern comprises determining that the first optical pattern and the second optical pattern are each included in the image.

8. The method of claim 1, wherein determining the spatial relation between the first optical pattern and the second optical pattern comprises:
   determining a distance between the first optical pattern and the second optical pattern; and
   determining that the distance between the first optical pattern and the second optical pattern satisfies a threshold distance.

9. The method of claim 1, wherein the computing device is attached to a worker wearing the article of PPE.

10. The method of claim 1, wherein the safety condition comprises at least one of:
- a worker-down event, wherein a worker has fallen;
- a visor event, wherein a visor position of a respirator or welding mask does not shield a face of a worker wearing the article of PPE;
- a respirator protection event, wherein a respirator is not worn over the nose of a worker wearing the article of PPE; or
- a hearing protection event, wherein hearing protection is not positioned to attenuate sound for the worker wearing the article of PPE.

* * * * *